Figure 14:
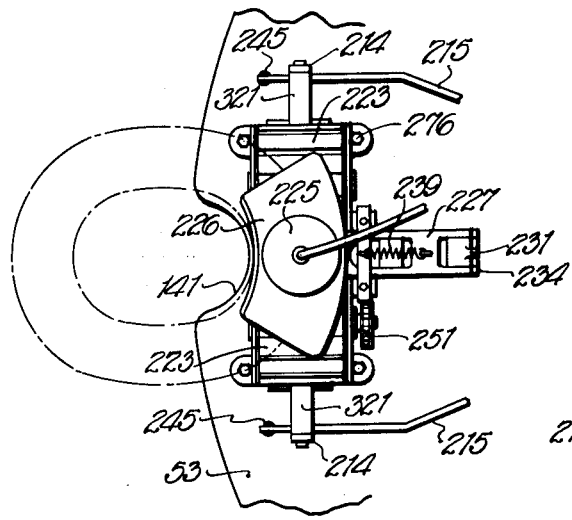

Feb. 21, 1939.  I. A. EICHENBAUM  2,148,153
AUTOMATIC HAT FINISHING MACHINE
Filed June 7, 1935   12 Sheets-Sheet 1
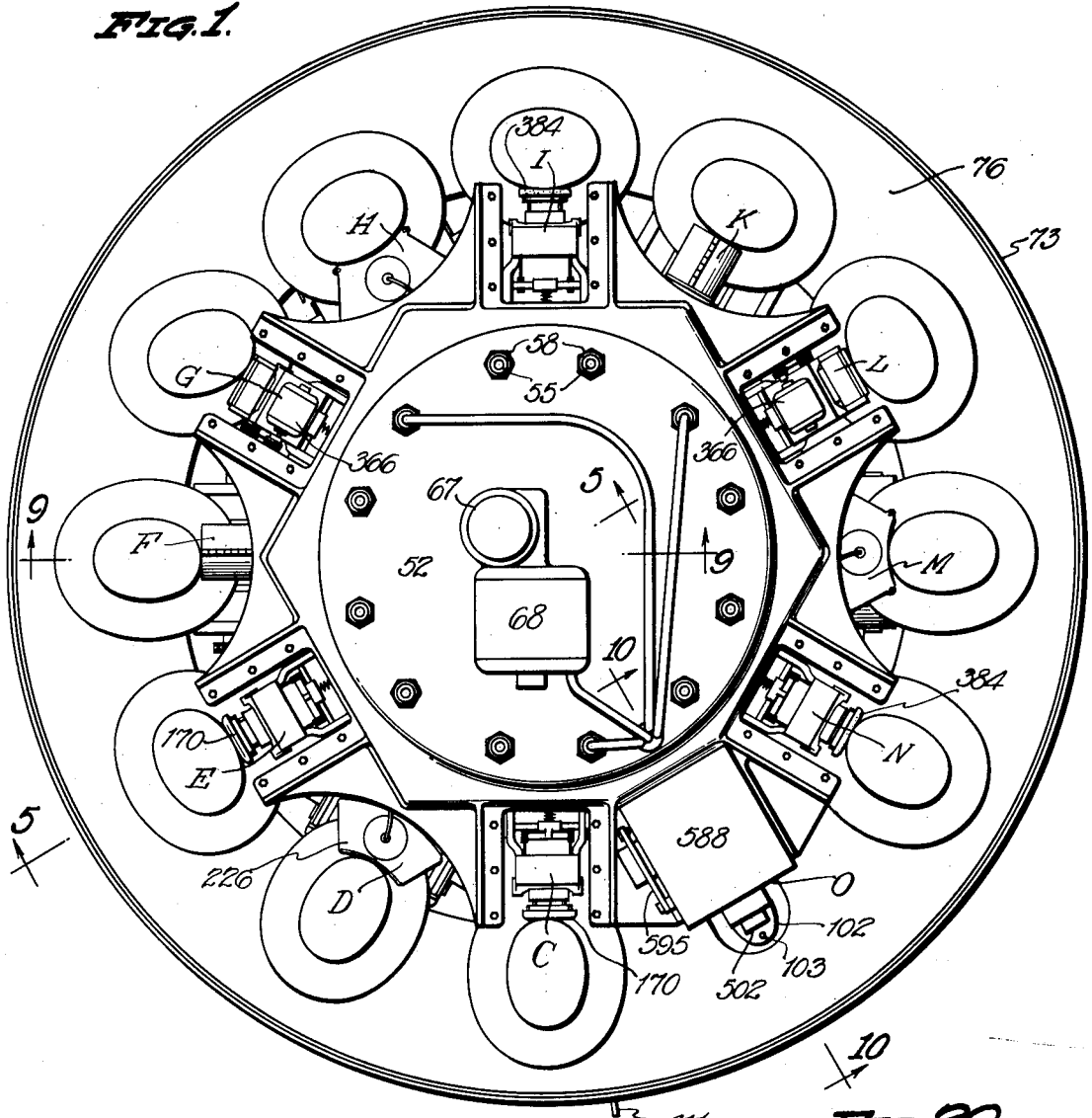
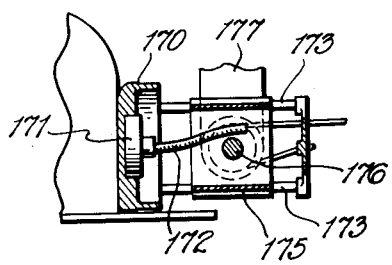
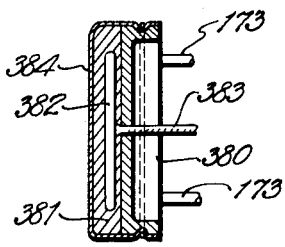
INVENTOR.
IRVING A. EICHENBAUM.

Feb. 21, 1939.　　　I. A. EICHENBAUM　　　2,148,153
AUTOMATIC HAT FINISHING MACHINE
Filed June 7, 1935　　12 Sheets-Sheet 2
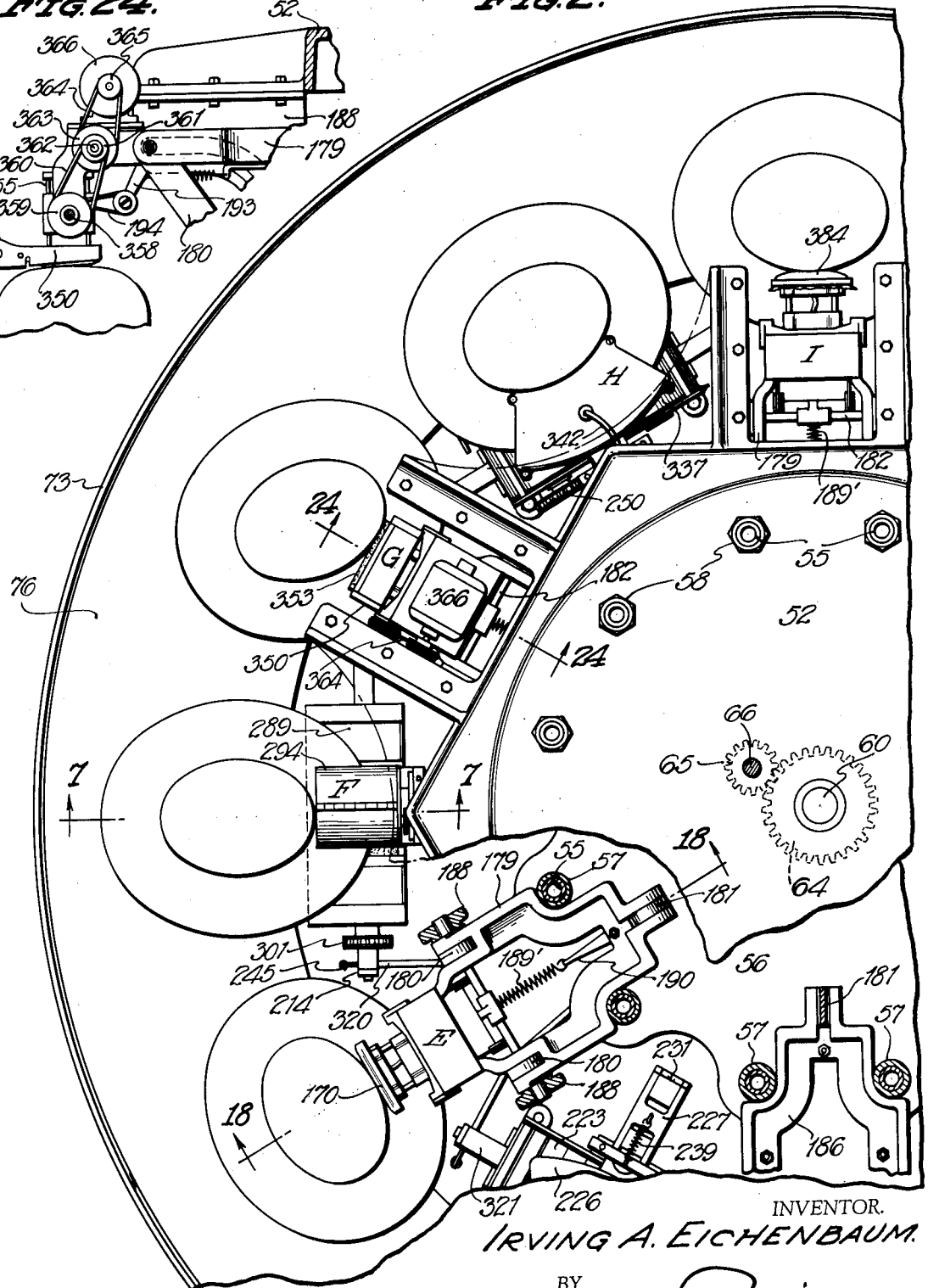
INVENTOR.
IRVING A. EICHENBAUM.
BY Ely Pattison
ATTORNEYS.
WITNESS:

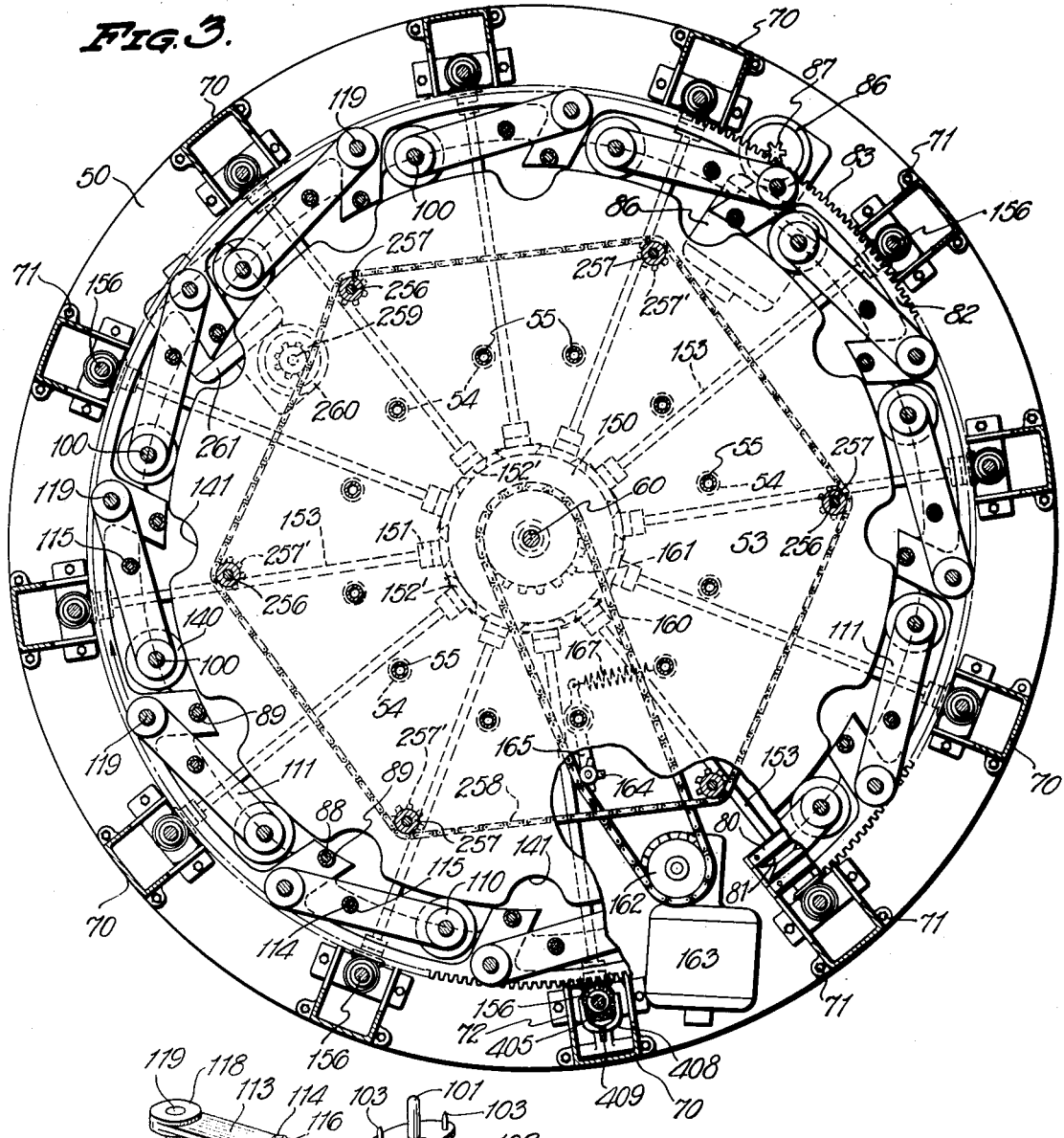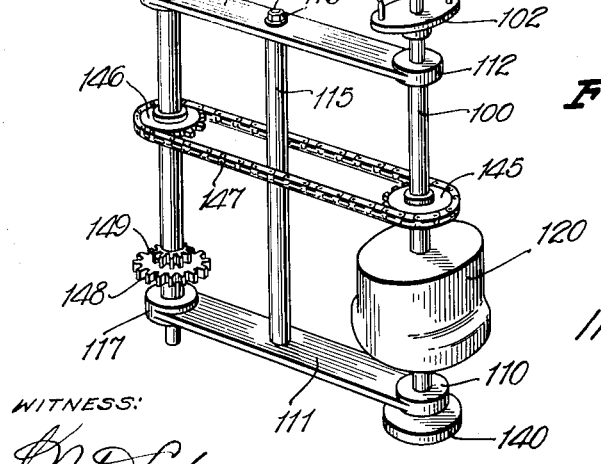

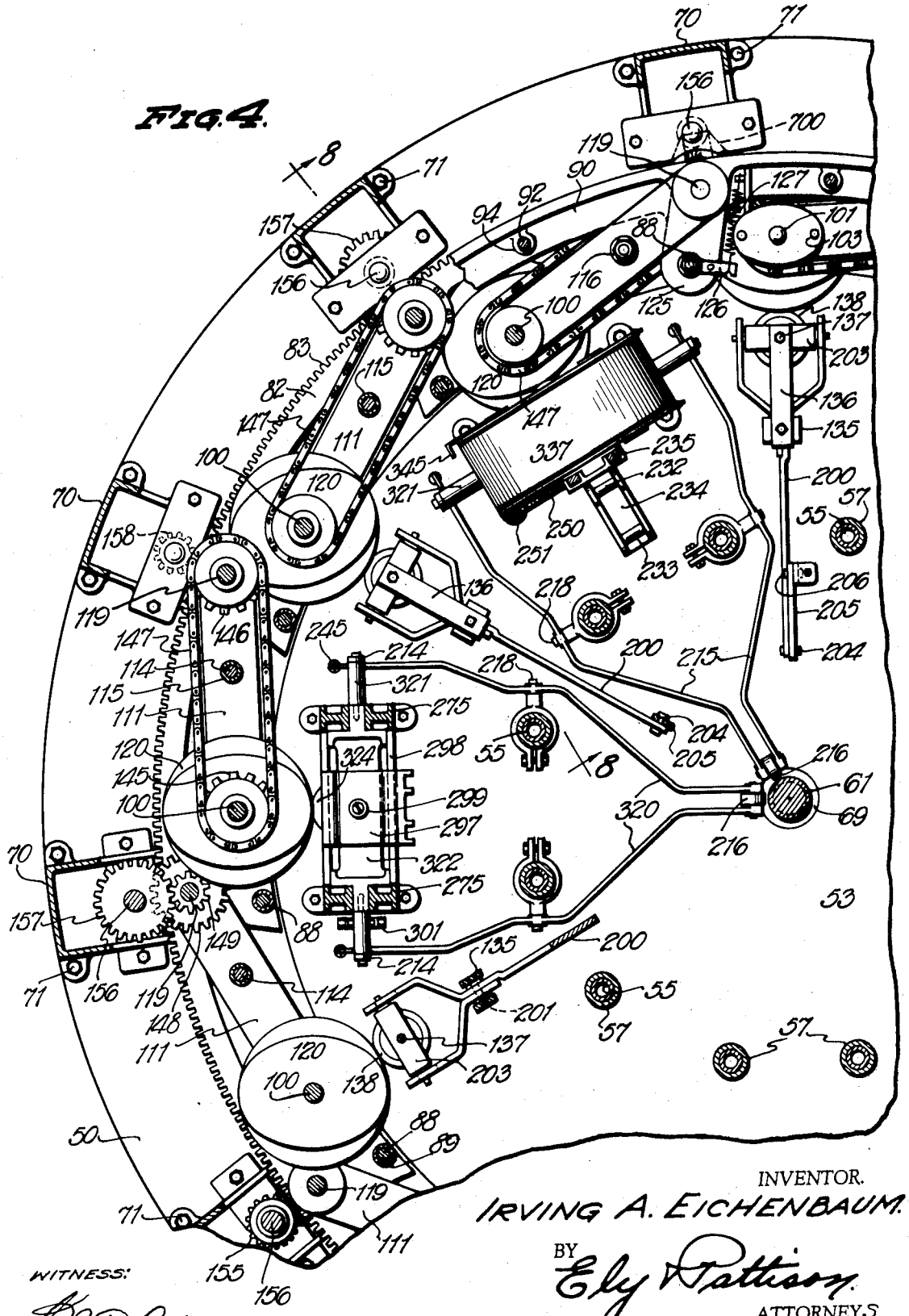

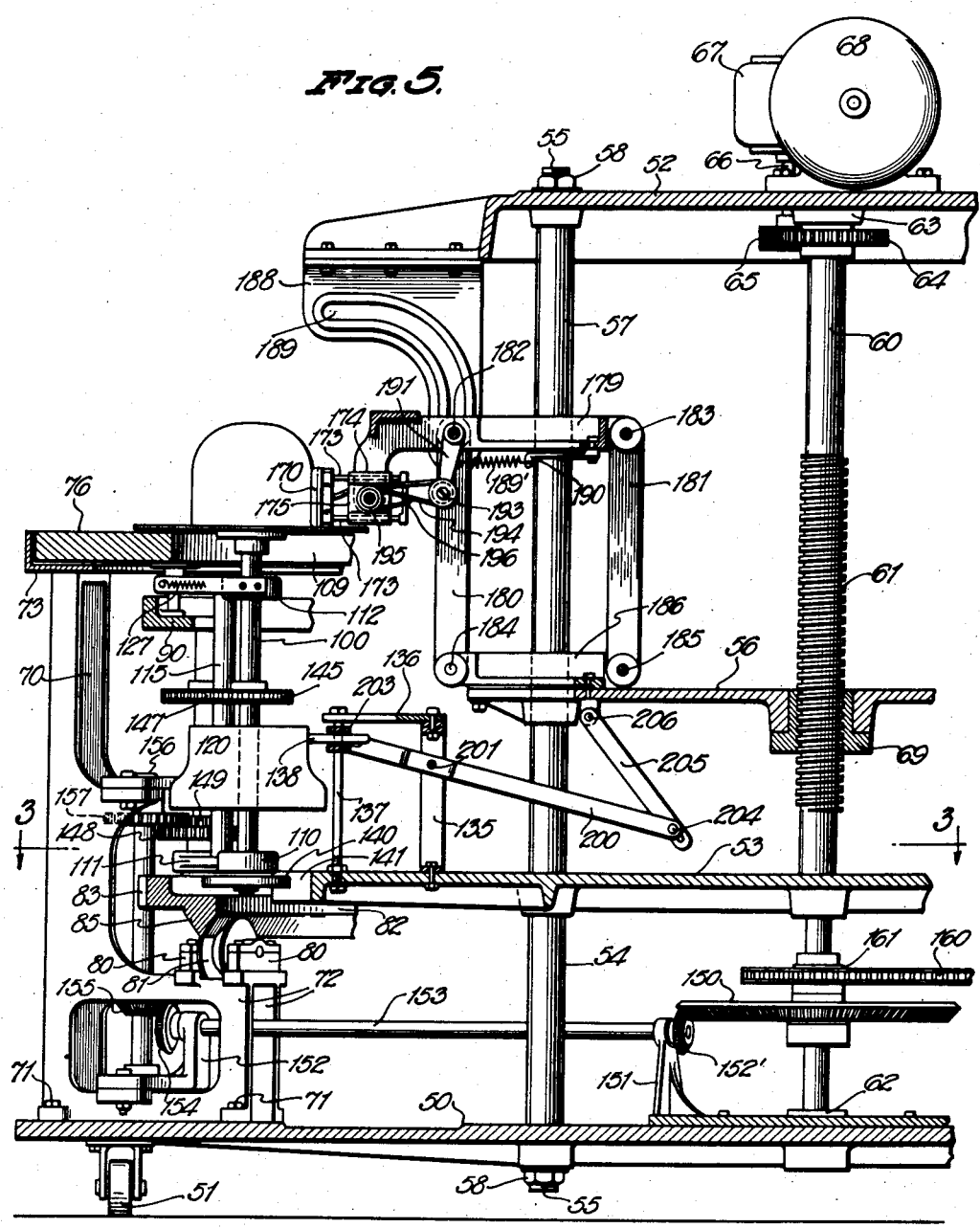

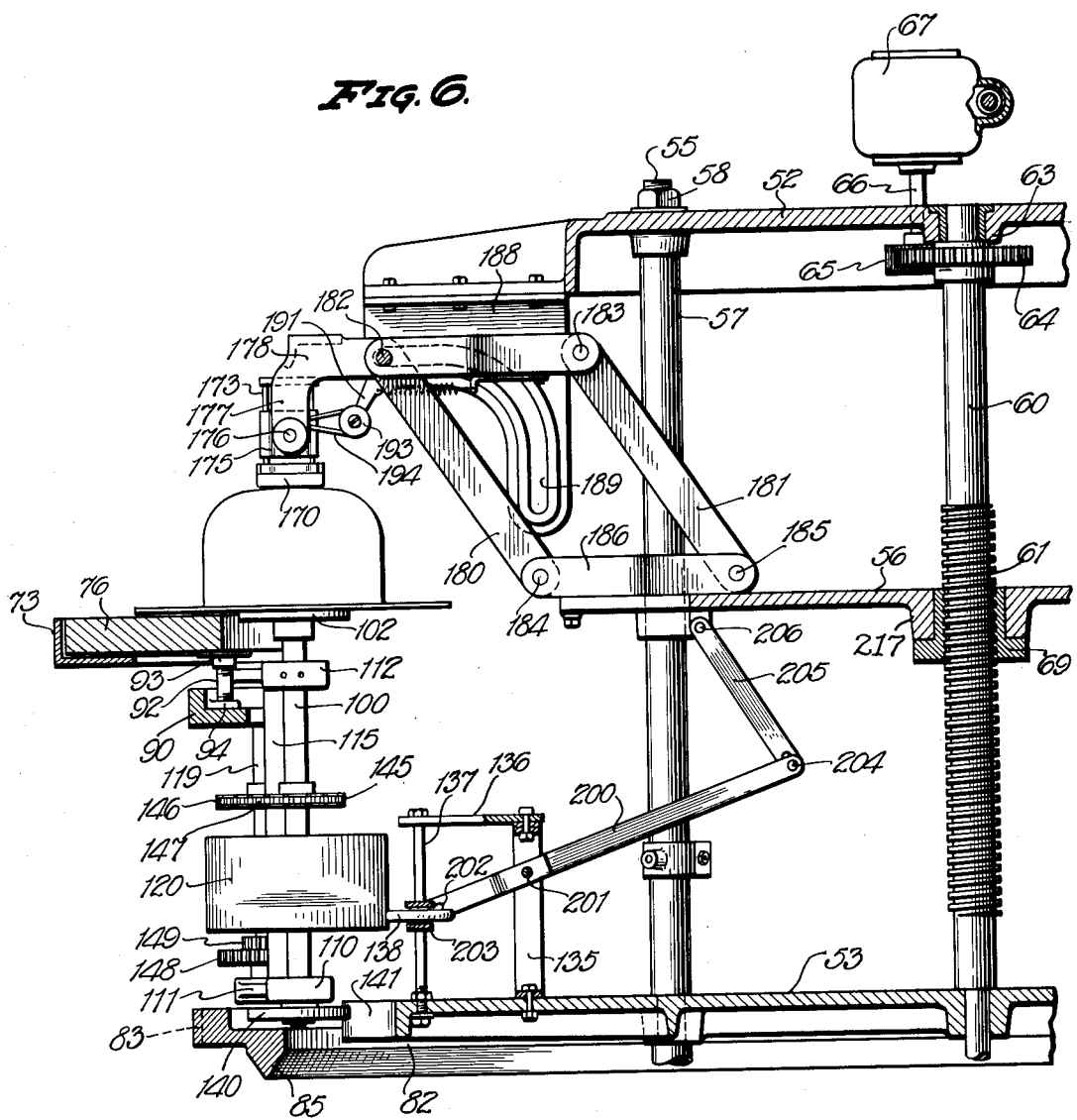

Feb. 21, 1939.    I. A. EICHENBAUM    2,148,153
AUTOMATIC HAT FINISHING MACHINE
Filed June 7, 1935    12 Sheets-Sheet 7
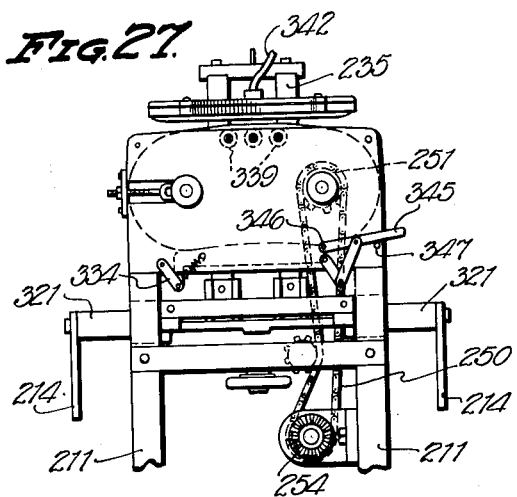
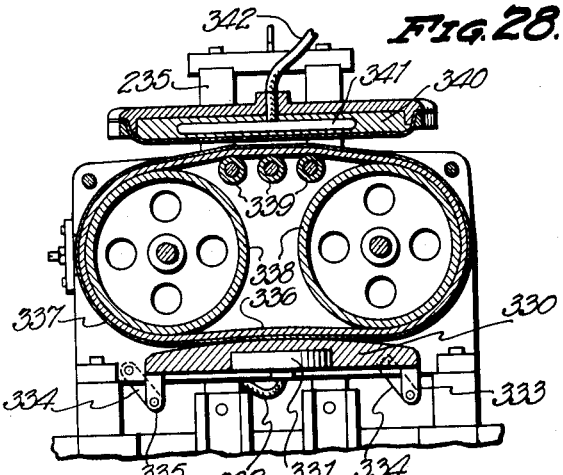
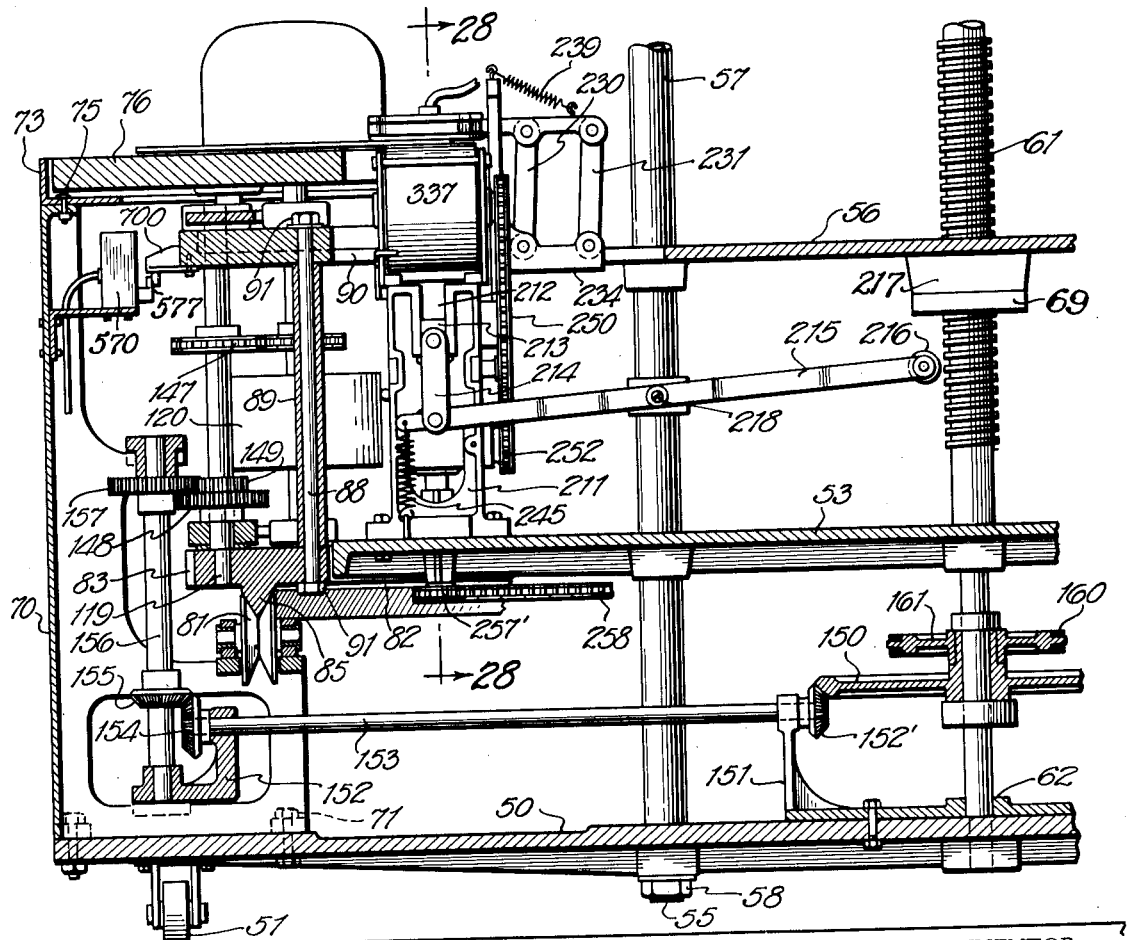
INVENTOR.
IRVING A. EICHENBAUM.
BY
ATTORNEYS.

Feb. 21, 1939.　　　　　I. A. EICHENBAUM　　　　　2,148,153
AUTOMATIC HAT FINISHING MACHINE
Filed June 7, 1935　　　　12 Sheets-Sheet 8
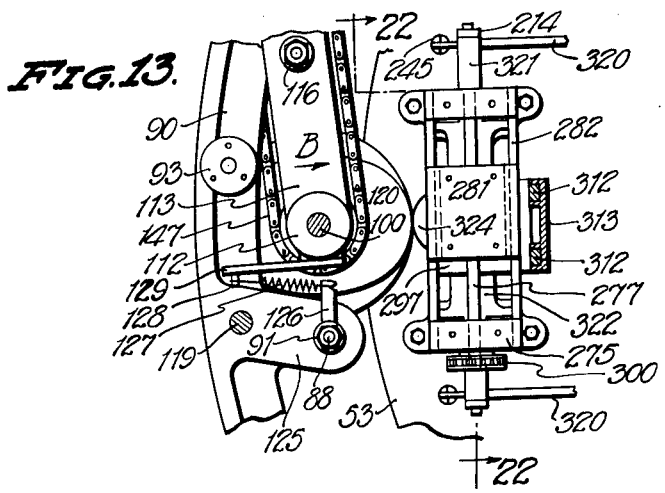
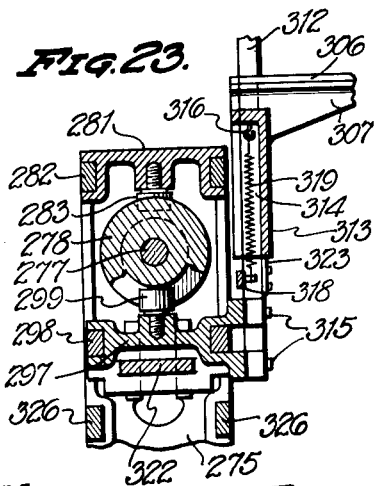
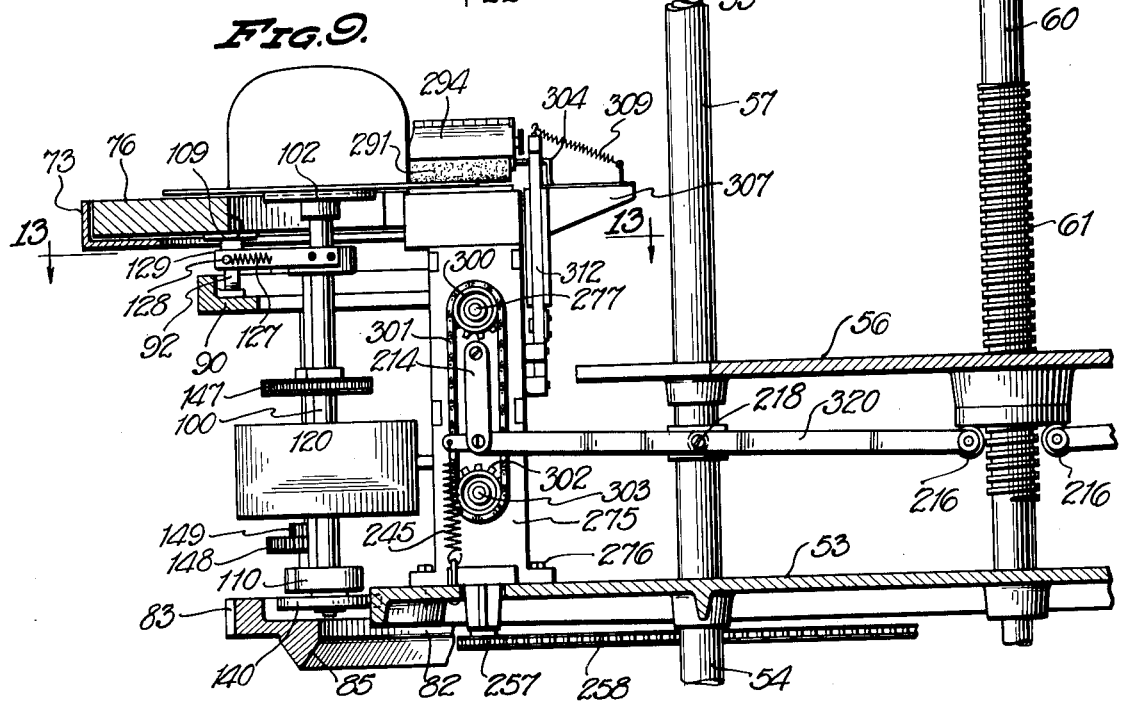
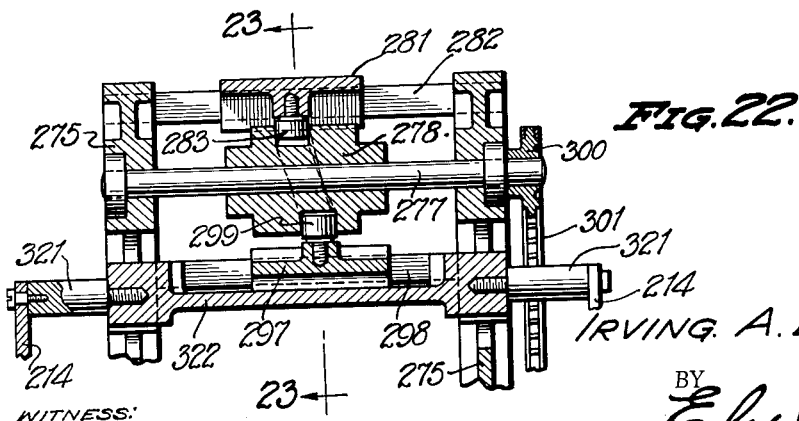
INVENTOR.
IRVING. A. EICHENBAUM.
BY
Ely Pattison
ATTORNEYS.
WITNESS:

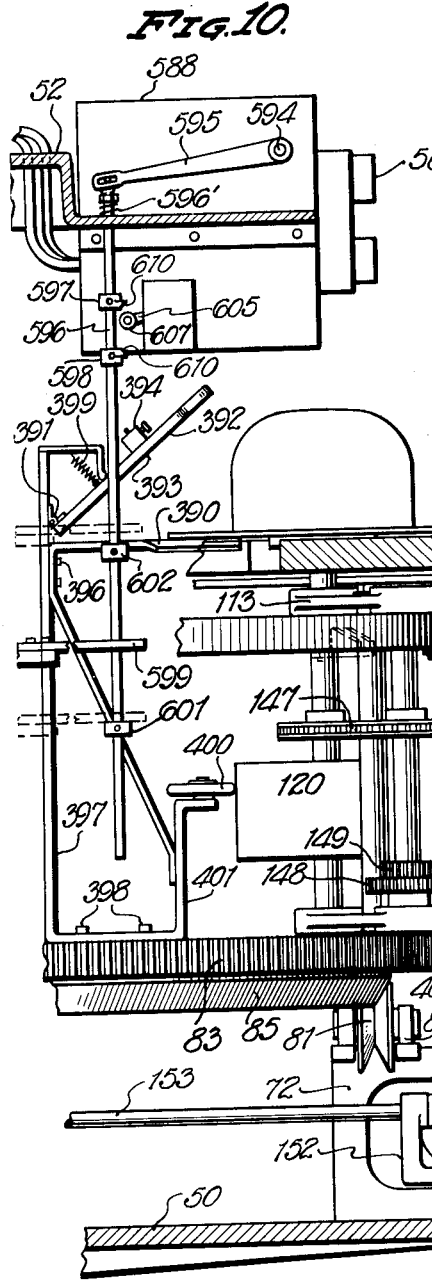

Feb. 21, 1939.    I. A. EICHENBAUM    2,148,153
AUTOMATIC HAT FINISHING MACHINE
Filed June 7, 1935    12 Sheets-Sheet 10
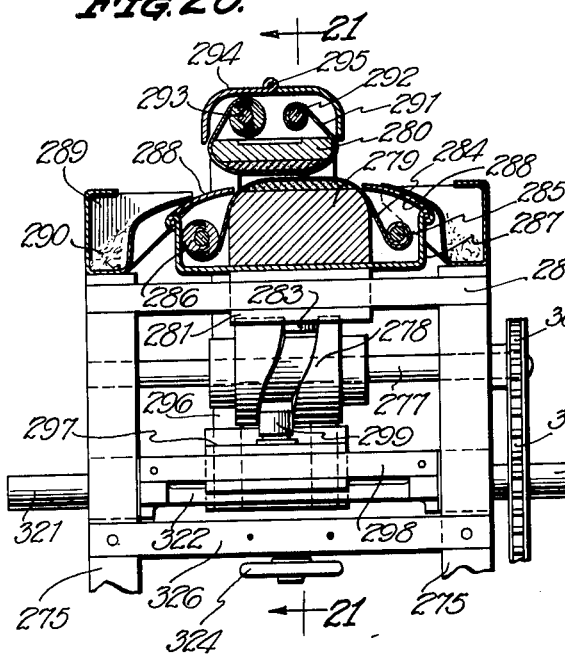
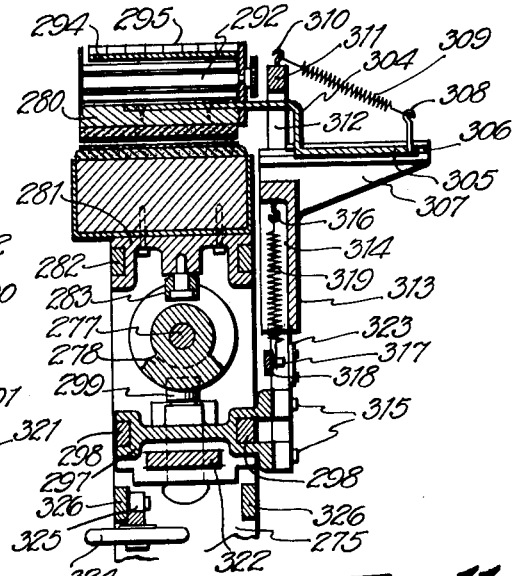
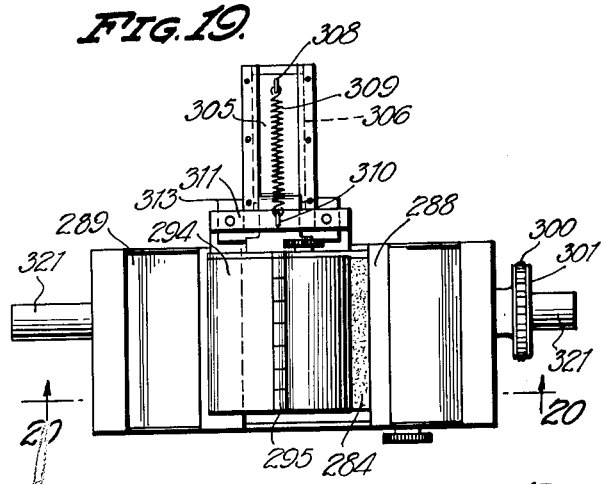
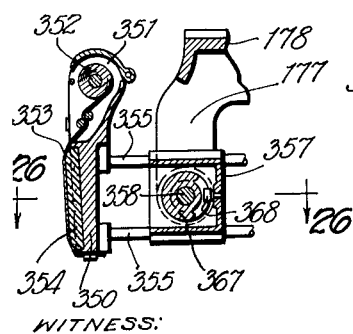
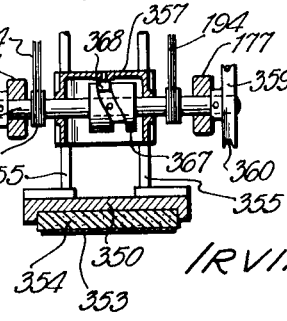
INVENTOR.
IRVING A. EICHENBAUM.
BY
Ely Pattison
ATTORNEYS.
WITNESS:

Feb. 21, 1939. I. A. EICHENBAUM 2,148,153
AUTOMATIC HAT FINISHING MACHINE
Filed June 7, 1935 12 Sheets-Sheet 11

INVENTOR.
IRVING. A. EICHENBAUM.
BY Ely Pattison
ATTORNEYS

WITNESS:

Feb. 21, 1939. I. A. EICHENBAUM 2,148,153
AUTOMATIC HAT FINISHING MACHINE
Filed June 7, 1935  12 Sheets-Sheet 12

INVENTOR.
IRVING A. EICHENBAUM.
BY Ely Pattison
ATTORNEYS.

WITNESS:

Patented Feb. 21, 1939

2,148,153

UNITED STATES PATENT OFFICE 2,148,153

AUTOMATIC HAT FINISHING MACHINE

Irving A. Eichenbaum, New York, N. Y.

Application June 7, 1935, Serial No. 25,401

24 Claims. (Cl. 223—7)

This invention relates to hat making machines and more particularly it pertains to machines for performing such operations as are necessary to the finishing of a blocked or otherwise shaped hat form.

One object of the present invention is to improve the construction and mode of operation of hat finishing machines and to provide such machines with mechanism which will effect a better finishing operation than is possible to attain with such machines as now constructed with which I am familiar.

In the so-called finishing of a hat, a blocked hat form is subject to several finishing operations known as ironing, pouncing, luring and rounding, which operations are performed in a predetermined sequence in order to produce the desired result.

A feature of the present invention consists in the provision of a machine in which the several operations afore-mentioned are performed automatically in accordance with a predetermined sequence of operation.

Another feature of the invention resides in a novel construction and arrangement of parts whereby a plurality of blocked hat forms may be operated upon simultaneously, thus greatly increasing the output of the machine over those machines which operate upon but a single form.

Another feature of the invention resides in a novel construction and arrangement of parts whereby a number of blocked hat forms which, as above stated, are adapted to be operated upon simultaneously, are automatically moved simultaneously from operative relation with one finishing tool to operative relation with the next succeeding finishing tool as the several operations are completed.

Still a further feature of the invention consists in the provision of a machine wherein, the hat forms when they are removed from the machine will be completely finished as hat forms and will need no further manipulation.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 15:
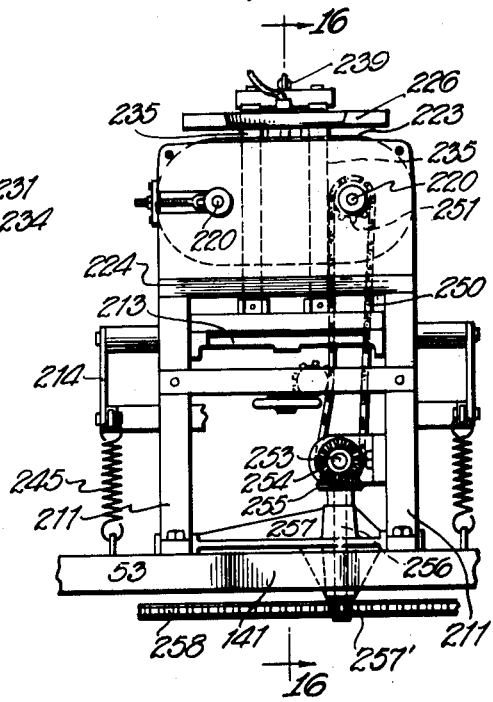
Figure 16:
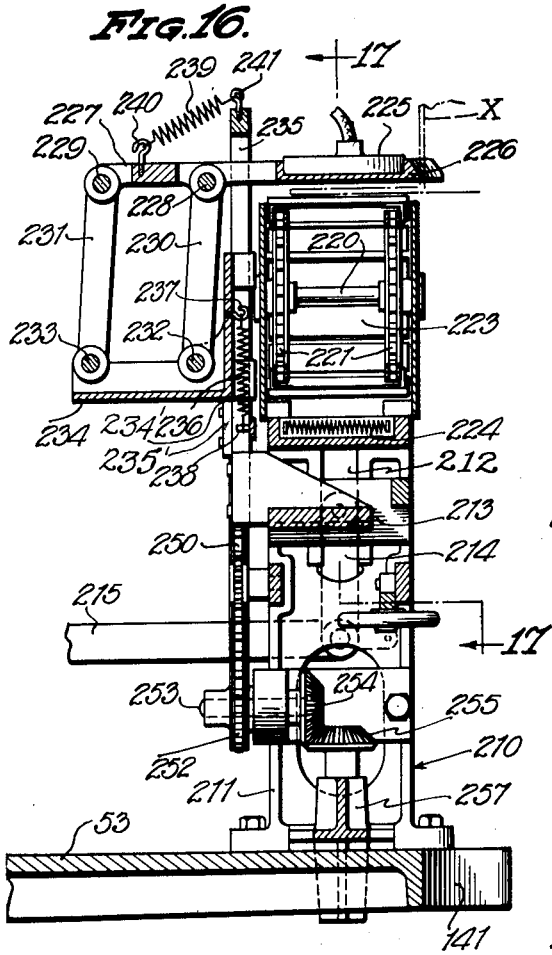
Figure 17:
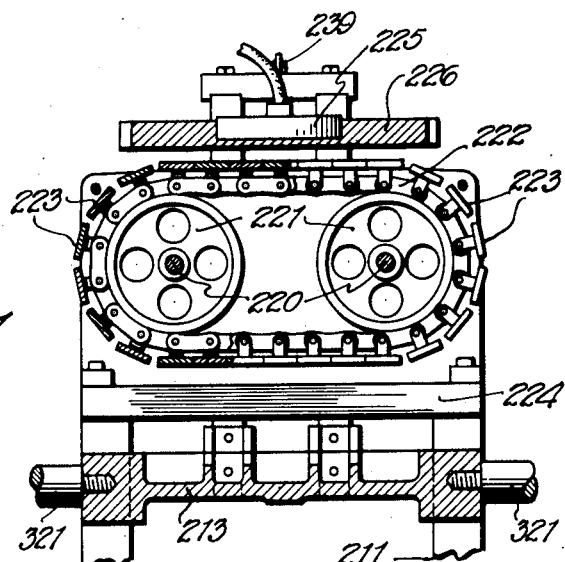
Figure 32:
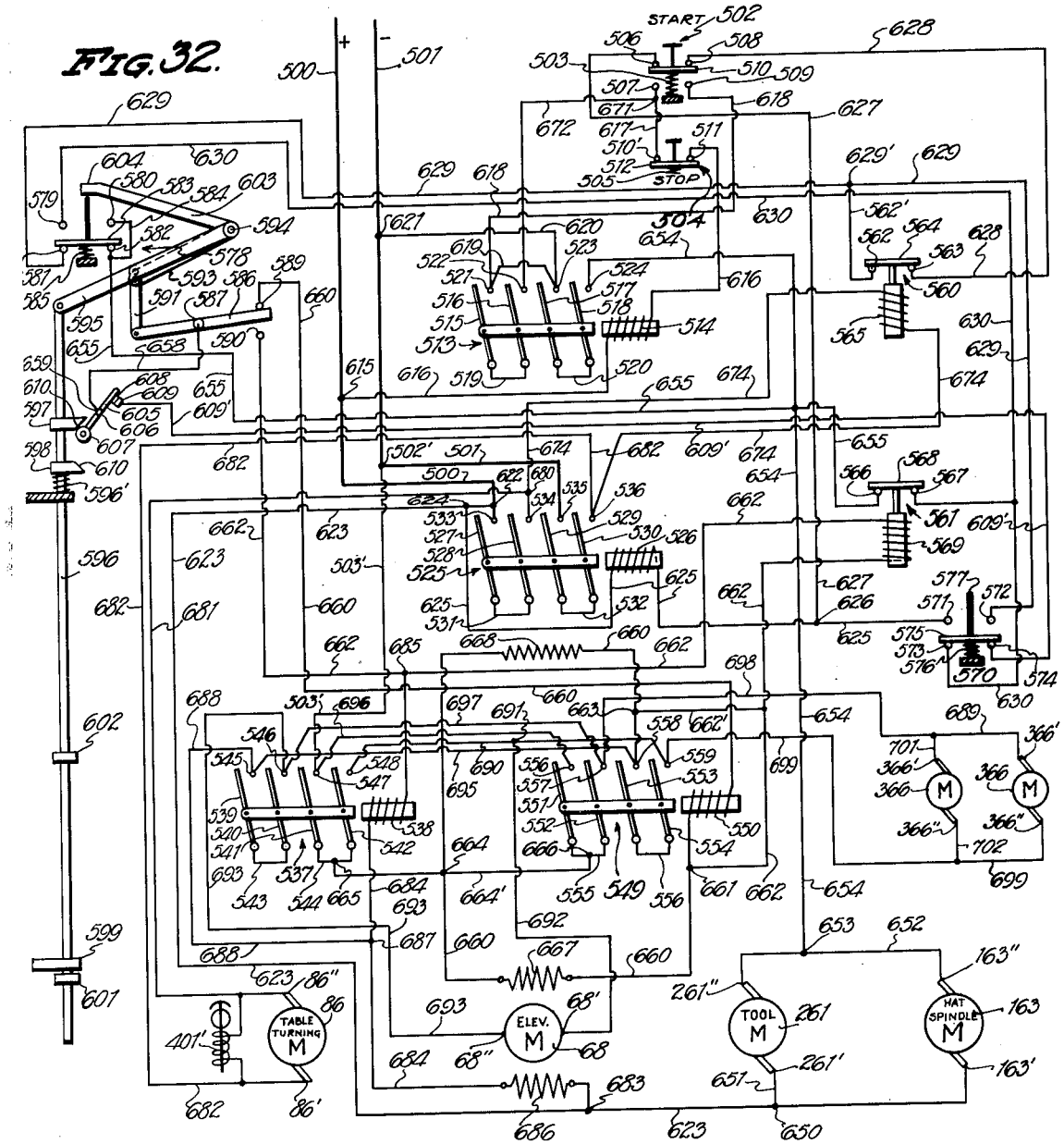
Figure 33:
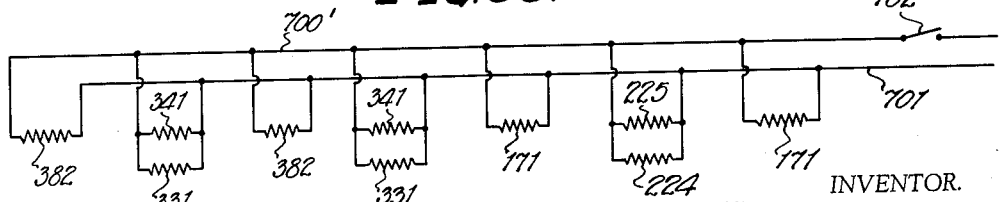

In the drawings,

Figure 1 is a top plan view of a hat working machine constructed in accordance with the present invention, Figure 2 is a fragmentary top plan view on an enlarged scale, the figure being partly broken away and partly in section, Figure 3 is a horizontal sectional view taken in a plane just above the cam plate and substantially on the line 3—3 of Figure 5, Figure 4 is a fragmentary horizontal sectional view on an enlarged scale, the same being a composite view with portions thereof being taken on different horizontal planes, Figure 5 is a fragmentary sectional view on an enlarged scale, the view being taken substantially on the line 5—5 of Figure 1, Figure 6 is a view similar to Figure 5 on a slightly reduced scale and showing the several parts in the position which they assume with the crown ironing tool upon the top of a hat crown, Figure 7 is a detail vertical sectional view taken substantially on the line 7—7 of Figure 2, Figure 8 is a vertical sectional view taken substantially on the line 8—8 of Figure 4, Figure 9 is a fragmentary vertical sectional view on an enlarged scale, taken substantially on the line 9—9 of Figure 1, Figure 10 is a fragmentary vertical sectional view taken substantially on the line 10—10 of Figure 1, Figure 11 is a fragmentary front elevational view of a crown working tool, Figure 12 is a detail perspective view of a hat form carrying spindle illustrating its driving and operating means, Figure 13 is a detail horizontal sectional view taken substantially on the line 13—13 of Figure 9, Figure 14 is a fragmentary top plan view of a hat brim ironing tool, Figure 15 is a view in elevation of a hat brim ironing tool, Figure 16 is a vertical sectional view taken substantially on the line 16—16 of Figure 15, Figure 17 is a vertical sectional view taken substantially on the line 17—17 of Figure 16, Figure 18 is a detail sectional view of a hat crown ironing tool, Figure 19 is a detail top plan view of a hat brim pouncing tool, Figure 20 is a detail vertical sectional view taken substantially on the line 20—20 of Figure 19, Figure 21 is a detail vertical sectional view taken substantially on the line 21—21 of Figure 20, Figure 22 is a detail sectional view taken substantially on the line 22—22 of Figure 13, Figure 23 is a detail sectional view taken substantially on the line 23—23 of Figure 22, Figure 24 is a detail view, partly in section and partly in elevation, illustrating a hat crown pouncing tool, Figure 25 is a detail sectional view of a hat crown pouncing tool, Figure 26 is a detail sectional view taken substantially on the line 26—26 of Figure 25, Figure 27 is a detail view in elevation of a hat brim luring tool, the view being taken substantially at right angles to that at which the tool is illustrated in Figure 8, Figure 28 is a vertical sectional view taken substantially on the line 28—28 of Figure 8, Figure 29 is a detail sectional view of a hat crown luring tool, Figure 30 is a detail top plan view of a hat brim trimming tool, Figure 31 is a detail perspective view of a portion of the control mechanism, Figure 32 is a diagrammatic view illustrating the several control circuits, switches, and operating means associated therewith, and Figure 33 is a diagrammatic view illustrating the heating circuits of the several hat form finishing tools.

A machine constructed in accordance with the present invention is preferably of substantially circular form as more clearly shown in Figure 1, and includes a plurality of tools for performing the various operations incident to the finishing of a hat blank or form more particularly of the felt type.

In its illustrated embodiment the several tools are arranged in a circular series and the several hat forms or blanks are intermittently moved to position to be successively operated upon by the various tools in accordance with a predetermined sequence of operation depending upon the location of the tools. The machine is automatic in its operation and the hat forms are moved as above described, automatically, after the operation of the machine has been started.

During the operation of the machine the finished hat forms are adapted to be removed from the machine and replaced by unfinished hat forms at a predetermined feeding point, this operation being performed manually by an attendant or operative.

In its illustrated embodiment the machine includes a base 50 which is preferably in the form of a flat circular plate and which is preferably supported by casters or the like 51 in order that the machine may have a degree of portability. The reference character 52 designates a cap plate and the cap plate is supported in spaced relation to the base plate 50 in a manner to be hereinafter described.

Mounted above the base plate 50 there is a cam plate 53. This cam plate is stationary and is supported by means of collars or the like 54 which surround bolts 55 extending vertically from the base plate 50. The collars 54 are preferably in the form of sleeves which surround the bolts 55 and are of the proper length to support the cam plate 53 in a substantially true horizontal plane. Mounted above the cam plate 53 there is a lift plate 56 which is adapted for vertical movement in a manner to be hereinafter more specifically described. The cap plate 52 heretofore mentioned rests upon sleeves 57, the lower ends of which rest upon the cam plate 53. These sleeves 57 surround the bolts 55. The cap plate rests upon the upper ends of these sleeves 57 and the bolts 55 are secured in position in such a manner as to clamp the base plate, cam plate and cap plate together to provide a rigid structure.

Arranged centrally of the machine and extending vertically thereof there is a shaft 60, an intermediate portion of which is formed with a screw thread 61. This shaft is mounted at its lower end in a bearing 62 carried by the base plate 50 and at its upper end in a bearing 63 carried by the under face of the cap plate 52. Upon its upper end this shaft carries a gear 64 with which meshes a gear 65 carried by a shaft 66 of a suitable reduction gear 67 which in turn is driven by a motor 68. This gear train provides the driving means for the shaft 60. The lift plate 56 heretofore mentioned has a bearing 69 which is threaded for engagement with the thread 61 in such a manner that as the shaft 60 is rotated, the lift plate 56 will be raised or lowered depending, of course, upon the direction of rotation of the shaft 60.

By reference to Figure 1, it will be noted that there are twelve stations at which the hat forms are subjected to the various operations incident to the finishing thereof. Secured to the base plate 50 and projecting vertically therefrom at each of these stations, there is a leg 70, these legs being secured to the base plate 50 by bolts or the like 71 and being located at points closely adjacent the outer periphery of said base plate. These vertically extending legs 70 are preferably formed of metal and are substantially U-shaped in cross sectional form, as best illustrated in Figure 3, and at their lower end, these legs each have inwardly projecting portions 72, the purpose of which will be hereinafter more specifically described. These several legs form means for mounting certain portions of the mechanism incident to the operation of the machine and upon their upper ends, said legs support an annular guard member 73 which is substantially angular in cross sectional form and which preferably extends entirely around the machine, as best illustrated in Figure 1. This angular guard 73 may be secured to the upper ends of the legs 70 by bolts or the like 75, as best illustrated in Figure 8. The reference numeral 76 designates a circular table which is adapted for movement within the guard 73 in order to bring the hat forms successively to position for operation thereon by the various tools, and the hat forms are carried by a plurality of hat blocks 77 best illustrated in Figure 7.

Mounted on the inwardly projecting portions of each of the legs 70 there is a pair of bearings 80, which bearings serve to mount grooved rollers 81. The grooved rollers 81 form the supporting means of a ring gear 82 having gear teeth 83 on its peripheral edge and being formed with an angular rib or flange 85 of a cross sectional shape corresponding to the shape of the groove in the rollers 81. By this means the ring gear 82 is supported in operative position. As best illustrated in Figure 3 this ring gear 82 is driven by a motor 86, the shaft of which is provided with a driving pinion 87, which in turn meshes with the teeth 83 of said ring gear. This ring gear provides the means by which the table 76 heretofore mentioned is supported and moved in its circular path in order that the various hat forms being operated upon may be moved successively into position relative to the various tools of the machine. The construction and mechanism by which this result is accomplished is best illustrated in Figure 8, in which the reference numeral 88 designates a plurality of standards carried by the ring gear 82 and projecting vertically therefrom. Surrounding each of these standards 88 there is a sleeve 89 which acts as a spacer for a ring 90 (see Figures 4 and 9), the lower ends of the spacer sleeves 89 having engagement with the ring gear 82 while their upper ends form a rest for the ring 90. These elements, the ring gear 82, standards 88, spacer sleeves 89, and ring member 90, are clamped together to provide a unitary rigid structure, by means of nuts 91 upon the ends of the standards 88. As best shown in Figure 6, the circular table 76 heretofore referred to, is supported and carried by the ring member 90 and is connected thereto by relatively short supporting legs 92, each threaded at one end into sockets 93 carried by the under face of the table, the opposite end of each being threaded into sockets 94 carried by the ring 90. By this construction and arrangement, it will be seen that as the ring gear 82 is driven by the motor 86, as heretofore described, the table 76 will be rotated with said ring gear.

The hat blocks 77 heretofore mentioned are adapted to be removably carried by the upper ends of spindles 100. As best shown in Figure 7, each of these spindles 100 has its upper end reduced as at 101 and secured to the reduced end of each there is a plate 102 provided with upwardly projecting prong members 103. Each hat block 77 is cut out as at 104 to provide a central portion 105 upon the lower end of which a plate 106 is secured. This plate 106 has a plurality of openings 107 which receive the prongs 103 to secure each hat block to the spindle in such a manner that as the spindle is rotated, the hat block will likewise be rotated. This construction is shown in Figure 7. As best illustrated in Figures 3 and 4, these several spindles 100 are carried by the ring gear 82 and the ring member 90 in order that they may travel with the table 76, and as best illustrated in Figures 5 and 9, project to a point above the top of said table, the table being notched as at 109 to receive said spindles 100, the several parts being so constructed and arranged that the plate 102 upon which the hat forms are supported will be substantially flush with the upper surface of the table 76.

These spindles 100 are all of substantially the same construction and are all mounted in substantially the same manner, and the description of the construction and mounting of one will, therefore, be sufficient.

Referring to Figure 12, it will be seen that the spindle 100 is mounted at its lower end in a bearing 110 in the inner or free end of an arm 111, while its upper portion is mounted in a bearing 112 in the inner or free end of an arm 113. These arms 111 and 113 are retained in spaced relation by means of a bolt 114 which passes through a spacer sleeve 115, the arms 111 and 113 being clamped to their respective ends of the spacer sleeve 115 by a nut 116. The bolt 114 and spacer sleeve 115 are connected to the arms 111 and 113 at a point intermediate their ends. The outer end of the arm 111 has a bearing 117 and the outer end of the arm 113 has a bearing 118. These bearings receive a suitable shaft 119 mounted at its lower end in the ring gear 82 (see Figure 8), the upper end of the shaft being suitably mounted in the ring member 90. The arms 111 and 113, the spindle 100, the bolt 114, and the spacer sleeve 115 are so connected together as to form a rigid frame-like structure which is pivotally mounted to swing about the shaft 119 for a purpose to be hereinafter described. Mounted upon the spindle 100 there is a cam member 120 which is of substantially the same contour as the hat blocks upon which the forms are mounted and this cam member is adapted to determine the extent of swinging movement in one direction of the frame member shown in Figure 12, in a manner to be hereinafter more specifically described.

By reference to Figure 13 it will be seen that the standards 88 pass through projecting lugs 125 which extend inwardly of the ring member 90. Projecting from each of these lugs there is an arm 126 to which is connected a spring 127, the other end of which is connected as at 128 to an arm 129 which in turn is attached to the bearing 112. The spring 127 tends to pull the structure which comprises the arms 111 and 113 inwardly of the machine or in the direction of the arrow B in Figure 13.

Carried by the cam plate 53 there is a bracket 135 upon the upper end of which there is an arm 136 which is held in spaced relation with respect to the cam plate 53 by a standard 137. This standard 137 forms a shaft for mounting a wheel or the like 138 and this wheel in each instance, by reason of its engagement with a cam of a hat block spindle, determines the swinging engagement of the arms 111 and 113 and the consequent swinging movement of the hat block spindle carried thereby. It is to be understood that there will be one of these wheels and its mounting for each of the crown operating tools, it not being necessary to employ this construction in connection with the brim operating tools. By this construction it will be apparent that as the cams 120 are rotated, the spindles which carry the hat blocks will have a swinging movement corresponding to the contour of the cam 120 and that, therefore, the hat block supporting spindle may be caused to follow a swinging movement which corresponds to the oval or other shape of a crown being operated upon by the crown tools.

Carried by the lower end of each of the hat block spindles 100, there is a roller 140, and these rollers are adapted for engagement with the cam plate 53 in order that the hat block spindles may in their movement from one operating position to the next succeeding operating position, be moved outwardly of the rotary table in order that the hat blocks and the forms carried thereby will not interfere with the tools during the rotating movement of the table. The cam plate 53 is provided with a plurality of recesses 141 in its peripheral edge, and there will be one of these notches for each station at which an operation is performed. By this construction it will be recognized that as the table 76 is rotated and the rollers 140 engage the peripheral edge of the cam plate 53, the several hat block spindles will be rocked outwardly about their shaft 119, and that as the rollers 140 pass into the recesses 141, the hat block spindles will be permitted to move inwardly of the machine so that the cams 120 carried thereby may engage the respective wheels 138 to insure proper operating of the crown tools, and further, to insure that the hat forms carried by the blocks will be moved inwardly of the machine a sufficient distance to be operated upon by the brim tools. It is to be understood that this action is assured by reason of the springs 127, heretofore described.

Carried by each of the spindles 100 there is a driving element, preferably in the form of a sprocket wheel 145, and carried by the shaft 119 there is a sprocket wheel 146, and passing around these sprocket wheels there is a driving chain 147. The spindles 100 are adapted to be rotated by the driving chain 147 from the sprocket 146 and the sprocket 146 will be driven in a manner now to be described. Carried by the shaft 119 there are two gears 148 and 149, the gear 148 being the larger of the two gears. Loosely mounted on the shaft 60 there is a beveled gear 150. Extending radially of the machine and mounted in bearing brackets 151 and 152, there is a shaft 153. As best illustrated in Figure 3 of the drawings, there are twelve of these shafts 153, there being one for each station at which an operation is performed and at the inner end of each shaft there is a beveled gear 152' which meshes with the beveled gear 150. The outer end of each of these shafts carries a beveled gear 154, each of which meshes with a beveled gear 155 carried by a shaft 156, and upon the upper end of which there is a gear 157. The gear 157 on certain of the shafts 156 is smaller or of less number of teeth than those on the remaining shaft, as best illustrated in Figure 4, and these smaller gears are designated 158. It will also be noted that the smaller gear 158 will be located in a lower plane on its respective shaft 156 than the plane of the larger gears 157 on their respective shafts. By this construction it will be apparent that as the ring gear and its associated parts is rotated, the gears 148 and 149 will be moved or brought into position to engage the gears 157 and 158. Thus, when it is desired to drive the hat block spindles at low speed, the larger gear 148 will be brought into engagement with the smaller driving gear 158 and when it is desired to drive the hat block spindles at a high speed, the smaller gears 149 will engage the gear 157.

From the foregoing it will be apparent that as the shaft 60 is rotated, through the medium of the beveled gear 150, the shafts 153 will be driven, and that through the medium of the beveled gears 154 and 155, the several shafts 156 will be driven in order to drive their respective gears 157 or 158, as the case may be. As best shown in Figures 3 and 5, a sprocket 161 may be driven by a chain 160 loosely carried by the shaft 60, and this chain 160 also passes around a sprocket 162 driven at a suitable speed by means of a suitable motor 163. As best illustrated in Figure 3, a suitable tension device in the form of a sprocket 164 carried by an arm 165 pivotally mounted as at 166, and connected to a spring 167 anchored as at 168, is provided, this tension device serving to take up the slack in the chain 160. The sprocket 161 is operatively connected with the beveled gear 150 in order to drive the latter. The different speeds of rotation of the hat block spindles is desirable since a better effect is had if the hat blocks and forms carried thereby are rotated at a relatively high speed during operation upon the crowns of the forms, as distinguished from the operation on the brims of the forms, since the travel of the brims during the operation is continuous in one direction, while in operating upon the crowns a greater area is to be covered and the movement of the tool relative to the crown is both in a horizontal plane and a vertical plane in order that the tool may ride upwardly to at least the top center of the crowns.

In Figure 1 of the drawings, the several stations together with the tools for performing the operations at these stations, are shown. The tool designated C is a crown iron, and reading clockwise of the figure, the tool D is a brim iron, the tool E is a crown iron, the tool F a brim pouncer, the tool G a crown pouncer, the tool H a brim lure, the tool I a crown lure, the tool K a brim pouncer, the tool L a crown pouncer, the tool M a brim lure, and the tool N a crown lure. At the station designated O, the hat blocks are removed from the block spindles and at this point a brim trimmer may be located if desired in order that the brims may be rounded to the proper width at this station, and it is at this station that the hat block carrying the finished hat form is removed from the hat block spindles, and a hat block carrying an unfinished hat form substituted for the one removed.

There are two crown irons and the specific construction of these crown irons is more clearly shown in Figures 5 and 18. Referring to Figure 18, each crown iron consists of an ironing member or element 170 in which is mounted in any suitable manner an electric heating element 171 supplied with current through a suitable conductor 172. Rods 173 extending from the ironing member 170, operate in bearings 174, (see Figure 5) carried by a block 175 mounted upon a shaft 176, (see Figure 11) which in turn is mounted in downwardly extending ends 177 of arms 178 projecting outwardly of a casting 179, which casting is pivotally mounted upon the upper ends of two levers 180 and 181 as at 182 and 183 respectively. As best shown in Figure 2, at the outside of the machine there are two levers 180, there being but one lever 181 on the inner end of the casting 179. The lower ends of the levers 180 and 181 are pivotally connected as at 184 and 185 respectively, to a casting 186 carried by the lift plate 56. Depending from the cap plate 52 there are two slotted members 188 each provided with a curved slot 189, and the shaft which forms the pivotal point 182 of the levers 180 carries rollers on its ends, which rollers travel in the slots 189 of the members 188.

By this construction and arrangement of parts it will be apparent that as the lift plate rises by rotation of the screw 161, the levers 180 and 181 will be elevated, and as the shaft which forms the pivotal point 182 follows the contour of the slots 189, the crown iron 170 will follow the contour of the crown and will move from the position in which it is shown in Figure 5 to the position in which it is shown in Figures 6 and 11, which position is at the top center of the crown. Means is provided to maintain pressure of the crown iron against the crown of the hat form being operated upon thereby, and this tensioning device consists of a spring 189' anchored as at 190 at one end and connected to a lever 191 at the other end, which lever is pivoted upon the shaft which forms the pivotal point 182. The lever 191 carries a grooved roller 193, and passing around said roller there is a double flexible member 194 which passes around a double grooved roller 195, and is connected as at 196 to a cross member carried by the rods 173 heretofore mentioned. By this construction, the tension of the spring 189 at all times exerts a pull to rock the lever 191 and through the medium of the double flexible member 194 forces the crown iron outwardly and maintains it in engagement with the crown of the hat form being operated upon.

As best illustrated in Figures 5 and 6, the wheel 138, which follows the contour cam 120 and which is slidably mounted upon the shaft 137, is adapted for movement vertically of the shaft by means of a lever 200. The lever 200 is pivotally mounted as at 201 and has a forked end 202 which engages the carriage 203 in which the wheel 138 is mounted. The opposite end of this lever 200 is pivotally connected as at 204 to a lever 205 pivotally connected as at 206 to the lift plate 56. By this arrangement of parts, as the lift plate is elevated in the manner heretofore described, the lever 209 is rocked to the position in which it is shown in Figure 6, causing the hat form supporting spindles to rotate in a substantially true circular path. As the lift plate 56 descends, the wheel 138 assumes the position illustrated in Figure 5, in which position it engages the oval part of the cam 120, causing the hat form supporting spindles to travel in a path conforming to the oval shape of the cam 120, which shape corresponds to the general shape of the hat crown.

Each of the crown ironing tools, the crown pouncers and the crown lures are mounted in the manner just described in order that the said tools may follow the contour of the hat crown during operation of the tools thereon, and it will therefore be unnecessary to describe the mounting of each of these tools in detail.

The brim ironing tool is shown in detail in Figures 14 through 17, inclusive. It will be seen by reference to these figures that this tool consists of a framework 210 mounted upon the cam plate 53. The framework consists of two vertical standards 211, each of which is provided with a guide 212 and in which there is slidably mounted a block 213. Projecting from the ends of this block 213 there are links 214, and pivotally connected to each of said links there is a lever 215. The inner ends of these levers 215 are brought together to provide means for mounting a roller 216 (see Figure 4), which roller is in the path of an operating member 217 carried by the lift plate 56. The levers 215 are pivotally connected as at 218 to the sleeve 57 surrounding the bolt 55. Mounted between the frame members 211 upon shafts 220, there are sprocket wheels 221 and passing around these sprocket wheels there is a chain 222. The chain has pivotally mounted thereon a plurality of individual irons 223, which in their passage around the lower portion of the sprockets 221, pass in the presence of an electric heater 224 in order that the irons may be heated to the proper degree when they pass thereby. 225 designates the heating element of an iron 226. The iron 226 has an extending arm 227 pivotally connected as at 228 and 229 to links 230 and 231, respectively, which links are mounted respectively, at 232 and 233 in a bracket 234. The bracket 234 is slidably mounted upon two standards 235, and is held in its down position by means of a spring 236 connected at one end to the bracket as at 237, the other end being connected to the frame as at 238. The iron 226 is maintained in engagement with the crown of the hat form by a spring 239 connected as at 240 to the arm 227 at one end, its other end being connected as at 241 to one of the arms 235. By this construction it will be seen that the iron 226 is rocked about the pivotal points 228, 229, 232 and 233 in a direction to the right in Figure 16, and is thus maintained in engagement with the crown X of the hat form and throughout the width of the brim thereof through an ironing operation.

As the machine is operated to position a hat brim beneath the iron 226, the lift plate 56 will be in its lowermost position, rocking the levers 215 about its pivotal point 218, which elevates the outer end of the lever against the action of the springs 245. Elevation of the outer ends of the levers 215 raises the block 213 through the medium of the links 214. Elevation of the block 213 moves the standards 235, which are carried thereby, in a vertical direction. The plates 235' are adjustably carried by the standards 235 and are so positioned upon said standards that, as the standards are moved upwardly as heretofore described, the plates engage the under face of the bracket 234 as at 234' in Figure 16 and elevate the same to move the iron 226 into spaced relation with the irons 223 in order that the hat brim may be inserted therebetween without buckling or creasing of the hat brim.

The sprockets 221 are driven by means of a chain 250 which passes around a sprocket 251 carried by the shaft of one of the sprockets 221. This chain 250 also passes around a sprocket 252 carried by a stub shaft 253 upon which there is a beveled gear 254, which meshes with a beveled gear 255 carried by a shaft 256 mounted in a suitable bearing 257. The lower end of this shaft 256 carries a sprocket 257' which is engaged by a chain 258 (see Figures 3 and 15). This chain 258 is driven by a sprocket 259 driven by a suitable reduction gear 260 which, in turn, is driven by a suitable motor 261 (see Figure 3).

The brim iron, brim pouncers, and brim lures are all driven in substantially the same manner.

The brim pouncing tools are illustrated in detail in Figures 9 and 19 through 22, inclusive. As best illustrated in Figure 9, a pair of standards 275 extend vertically from the cam plate 53 and they are secured thereto by suitable fastenings 276. The upper portion of these standards is in the form of a frame in which is mounted a shaft 277, which shaft carries a cam slotted member 278. The reference numeral 279 designates a pouncing block adapted for operation upon the under face of a hat brim, the reference numeral 280 designating a pouncing block adapted for operation upon the upper surface of a hat brim. The pouncing block 279 is carried by a block 281 slidably mounted in the member 282 of the frame, and this block 281 has a roller 283 which projects into the cam slot of the cam slotted member 278, as best illustrated in Figure 22. By this construction, as the shaft 277 is rotated to drive the cam 278, the pouncing block 279 will be given a plurality of relatively short reciprocations. The reference numeral 284 designates a suitable abrasive material of which sand paper is one very good example. This abrasive material is carried upon rollers 285 and 286 which provide for the adjustment of various portions of the abrasive material as it becomes worn and unfit for use. The rollers 285 and 286 are mounted in a suitable housing 287 having hinged covers 288 to prevent entrance of the material removed from the hat brim to the interior of the housing 287. Suitable receptacles 289 are employed to catch and retain the material removed from the hat brim by the pouncing operation, which material is designated 290 in Figure 20. The upper pouncing block 280 is of substantially the same construction as the one described and comprises an abrasive strip 291 carried by rollers 292 and 293 suitably mounted in a housing 294. The housing 294 is formed by two members pivotally connected at 295 in order that access to the rollers 292 and 293, for the purpose of renewing the abrasive strip, may be had.

This upper pouncing block is carried by vertically disposed standards 296, which in turn are carried by a block 297 slidably mounted in the member 298 of the frame. This block has a roller 299 which also travels in the cam slot of the cam slotted member 278. The arrangement of the cam in the cam slotted member 278 is such that the pouncing blocks 279 and 280 will be moved in opposite directions when the device is in operation.

The shaft 277 carries a sprocket wheel 300 around which passes a chain 301, which chain also passes around a sprocket wheel 302, (see Figure 9) carried by a shaft 303, which shaft is driven in the same manner as the shaft 253 heretofore described as a portion of the brim ironing tools and illustrated in Figure 16.

The upper pouncing block 280, as best illustrated in Figure 21, is movable also in a plane at right angles to that previously described, and for this purpose, the said block 280 is carried by an arm 304 having an extension 305 which is slidably mounted in guides 306 which, in turn, are formed with arms or brackets 307. Connected as at 308 to the extension 305, there is a coil spring 309, the opposite end of which is connected as at 310 to the cross bar 311, which connects the upper ends of a pair of uprights 312. The spring 309 tends to force the upper pouncing block 280 towards the left in Figure 21 and maintain the upper pouncing block in engagement with the crown so that the entire upper surface of the brim will be subjected to the action of the abrasive strip carried by the pouncing block.

The arms or brackets 307, heretofore mentioned, form a part of a casting 313, the body portion of which is hollowed out as at 314, and this casting is slidably mounted between the two uprights 312, heretofore mentioned. These uprights 312 are secured as at 315 to the block 297, heretofore described. Connected as at 316 to the casting 313 at one end and as at 317 to a cross pin 318 which extends between the uprights 312, there is a spring 319, and this spring tends to exert a downward pull upon the casting 313 to maintain the top pouncing block 280 in operative engagement with the brim through a pouncing operation.

Each of these pouncing tools has a lever 320 (see Figure 4) which is similar in its construction and operation to the levers 215, heretofore described in connection with the brim ironing tool, and these levers 320 operate in the following manner to open the brim pouncing tools during the time the hat forms are being moved from one station to another. But one of the levers 320 will be described. The links 214 which are connected to the arms of these levers 320 are also connected to the projecting stub shafts 321 carried by a lift block 322 see Figure 22, which is connected to the guides 298 in such a manner that as the inner end of the lever 320 is depressed, the lift block 322 and the sliding block 297 will be elevated. This will elevate the uprights 312, and through the medium of the plate 323, the casting 313 will be raised to elevate the top pouncing block 280, it being understood that the cam slot in the cam slotted member is of sufficient depth to permit of such operation without engagement of the roller 299 with the bottom of said slot. This lifting of the pouncing block 280 will relieve the pressure of the pouncing block upon the hat brim and leave the hat form free to move without damage thereto.

A roller 324 mounted as at 325 on a cross bar 326 which extends between the standards 275 is adapted to engage with the cam 120 of each hat form spindle during the pouncing operation in order that the hat form operated upon will at all times be maintained in proper engagement with the pouncing tool.

The brim luring tools, of which there are two, are shown in detail in Figures 8, 27 and 28. These tools are mounted for operation in the same manner as are the brim ironing tools heretofore described. They are, however, slightly different in construction and these differences will now be described.

Each brim luring tool includes a plate 330 in which there is suitably mounted an electric heating element 331 supplied with electricity by a suitable conductor 332. This plate is pivotally mounted as at 333 upon suitable links 334 in order that the same may be moved towards and away from the actual luring tool. The luring tool comprises an endless belt 336 having a canvas or other suitable facing 337. This endless belt is adapted to travel around pulleys 338, as best illustrated in Figure 28, the pulleys being driven by a chain corresponding to the chain 250 which drives the travelling member of the brim ironing tools and which is driven in the same manner as the chain in said brim ironing tools. The endless belt and its canvas cover pass in engagement with the plate 330 when the latter is elevated into contact therewith the press cloth being heated by said contact. The upper flight of the endless belt passes over rollers 339 and mounted directly thereabove, there is a heating plate 340, heated by a suitable electric heater 341 supplied with current by a suitable conductor 342. The plate 340 is adapted to be slightly spaced from the top flight of the endless belt with its canvas covering and the brim is adapted to be positioned between the endless belt and its canvas cover and said plate during the luring operation. The plate 330 heretofore mentioned, is raised and lowered by means of a pivoted lever 345 pivotally mounted as at 346 (see Figure 27) and which is manually operated for the purpose described. When the plate is in its up position, a suitable support 347 may be employed upon which the lever 345 rests to maintain said plate in said up position.

The upper plate 340 is mounted in the same manner as are the upper irons of the brim ironing tools described in connection with the construction and operation of these tools, as illustrated in Figure 16.

By this construction, with each operation of the machine to move a hat crown from one station to the next, the brim luring tools will be opened in the same manner as are the brim ironing tools in order that there will be no interference between these tools and the hat crowns as they are introduced to and removed from the luring tools.

The crown pouncers of which one is shown in Figure 24 of the drawings are mounted and operated in the same manner as the crown irons heretofore described. The actual tool, however, is of slightly different construction and this will now be described. By reference to Figures 24 through 26, it will be seen that the pouncer comprises a plate or the like 350, and this plate has an extended portion 351 in which is mounted a roller 352 about which a suitable strip of abrading material 353 is wound. The abrading material passes over the pad 354 carried by the plate 350 in order to provide a soft backing for the abrasive material.

This pad carries guide rods 355 which are similar to the rods 173 and are mounted in the same general manner within a housing 357. Extending through this housing 357 there is a shaft 358 which carries a driving pulley 359. Passing around this driving pulley 359, there is a driving belt 360 which passes around a pulley 361 carried by a stub shaft 362. Operatively connected with the pulley 361 there is a pulley 363, and passing around the pulley 363 there is a driving belt 364 which also passes around the driving pulley 365 of a suitable electric motor 366. By this means upon operation of the motor 366, the shaft 358 is rotated. The shaft 358 carries a cam grooved member 367 and the housing 357, heretofore mentioned, is provided with a roller 368 which rides in the groove of the cam grooved member 367. By this construction the housing and the pouncing head carried thereby is given a plurality of slight vibrations or reciprocations during operation to subject the hat crown being operated upon by the pouncing tool to an abrasive action. The pouncing tools are maintained in engagement with the hat crown by means of a tensioning mechanism, which includes the endless belts 194, a portion of each of which is shown in Figure 26. The crown lure is identical in every respect with the crown ironers except as to the luring head itself, which is shown in detail in Figure 29 as comprisng a block 380 having a body 381 in which is mounted a suitable heating element 382 supplied with an electric current by means of a suitable conductor 383. A suitable covering 384 which may be of canvas or any other material is secured about the pad 381 preferably as shown in Figure 29.

The station O, in Figure 1, is that station at which the finished hat crowns are removed from the hat crown supporting spindles and at this location a suitable hat rounder may be employed. As best shown in Figure 30, this hat rounder comprises a base 390 upon which is pivotally mounted as at 391 a knife carrying member 392, the knife thereof being designated 393 and carried in a block 394 slidably mounted in a slot 395 in the member 392, all of which is of conventional form and construction in tools of this character. As best illustrated in Figure 10, the base member 390 is rigidly secured as at 396 to a suitable supporting bracket 397, which in turn is secured to the cam plate 53 as at 398. The pivot point 391 of the member 392 is located on the bracket 397, as best shown in Figure 10, and the member 392 is maintained in its elevated position by means of a spring 399 which will, however, permit of depression of the member 392 into engagement with the hat crown brim for rounding the same. In order that the brim may be evenly cut, the cam 120 heretofore described, engages with a roller 400 mounted in an extension 401 of the bracket 397. By this construction, the hat crown supporting spindle will be so rotated that the finished brim will be of the same width entirely around the crown of the hat form.

At this station, the gear 405 which is substantially the same as the gear 157, heretofore described, slides upon its shaft 156. In order to effect sliding of this gear, a collar 406 is secured to the gear and splined to the shaft 156. Pivotally mounted as at 407 there is a yoke 408, and this yoke is connected to a link 409, the upper end of which is connected as at 410 to a hand lever 411 pivotally mounted as at 412 to the leg 70 at this station. A spring 413 tends normally to force the link 409 upwardly to maintain the gear 405 in driving engagement with the gear 148 normally to maintain the hat supporting spindle in rotation. In removing a hat crown from the hat crown supporting spindle, it is desirable to stop rotation, and this is effected by lifting the outer end of the lever 411 and through the medium of the link 409, rocking the yoke 408 to its down position to disengage the gear 405 with the gear 148. A finished hat crown being removed, it is replaced with an unfinished hat crown and block after which the lever 411 is released permitting the gears 405 and 148 to again mesh and drive the hat crown supporting spindle.

In Figure 32 is illustrated the wiring diagram of the electrical apparatus employed in the operation of the machine and in said figure the power line has two legs 500 and 501. The reference numeral 502 designates a double throw starting switch and this switch is normally held in the position in which it is shown by means of a resilient member 503 which also serves to return the switch to its normal position after a manual operation thereof. The numeral 504 designates a single throw stop switch which is manually operated, and which normally occupies the position in which it is shown, to which position it is returned under the influence of a resilient member 505.

The starting switch 502 consists of four contacts 506, 507, 508, and 509. The contacts 506 and 508 constitute one pair of contacts, the contacts 507 and 509 constituting another pair. The reference numeral 510 designates a connector which is adapted to bridge either the contacts 506 and 508 or 507 and 509 depending upon the operation thereof.

The stop switch 504 has two contacts 510' and 511 which are adapted to be bridged by a connector 512, which is normally held in engagement with said contacts by the resilient member 505.

The reference character 513 designates a multiple contact switch which is of a conventional type and which is held normally in its open position by gravity and which is moved to its closed position by means of an electro-magnet 514. This switch 513 comprises four contact arms 515, 516, 517, and 518. The contact arms 515 and 516 are connected by a conductor 519, the contact arms 517 and 518 being connected by a conductor 520. When the switch is in its circuit closing position the arm 515 is adapted to engage a contact 521; the arm 516 a contact 522; the arm 517 a contact 523; and the arm 518 a contact 524.

The reference numeral 525 designates a switch similar in construction and operation to the switch 513 just described. This switch 525 is electrically operated by an electro-magnet 526 which moves the same to its circuit closing position, the switch being moved to its circuit opening position by gravity. This switch 525 comprises a plurality of switch arms 527, 528, 529, and 530. The switch arms 527 and 528 are connected electrically by a conductor 531, the switch arms 529 and 530 being electrically connected by a conductor 532. When the switch is in its closed position, the switch arm 527 is adapted to engage a contact 533; the switch arm 528 is adapted to engage a contact 534; the switch arm 529 is adapted to engage a contact 535; and the switch arm 530 a contact 536.

The reference numeral 537 designates a switch similar to the one 513, and this switch is moved to its closed position by an electro-magnet 538, it moving to its open position, which position it normally occupies by gravity. This switch 537 comprises a plurality of switch arms 539, 540, 541, and 542. The switch arms 539 and 540 are electrically connected by a conductor 543, the switch arms 541 and 542 being electrically connected by a conductor 544. When this switch 537 is in its closed position, the switch arm 539 is adapted to engage a contact 545; the switch arm 540 a contact 546; the switch arm 541 a contact 547; and the switch arm 542 a contact 548.

The reference character 549 designates a switch similar to the switch 513 and this switch 549 is moved to its circuit closing position by an electrical magnet 550, the switch being held in its circuit opening position by gravity. This switch 549 comprises a plurality of switch arms 551, 552, 553, and 554. The switch arms 551 and 552 are connected electrically by a conductor 555, the switch arms 553 and 554 being electrically connected by a conductor 556. When this switch 549 is in its circuit closing position, the switch arm 551 is adapted to engage a contact 556; the switch arm 552 a contact 557; the switch arm 553 a contact 558; and the switch arm 554 a contact 559.

The reference numerals 560 and 561 designate two time switches. The time switch 560 includes two contacts 562 and 563 which are adapted to be bridged by a connector 564 operated by a conventional electro-magnet 565 which is so arranged as to cause a lapse of a predetermined length of time during the opening and closing of said switch 560. The switch 561 comprises two contacts 566 and 567 which are adapted to be bridged by a conductor 568 operated by an electro-magnet 569 similar in construction and operation to the electro-magnet 565 above mentioned.

The reference numeral 570 designates a switch which includes four contact points 571, 572, 573, and 574. A connector 575 is adapted to bridge either the contacts 571 and 572 or the contacts 573 and 574. This connector is moved to position to engage the contacts 571 and 572 by a suitable spring or the like 576 and it has an extension 577, the purpose of which will be hereinafter more specifically described.

The reference numeral 578 designates a switch which has four contact points 579, 580, 581, and 582. A connector 583 is adapted to connect either the contacts 579 and 580 or the contacts 581 and 582. The contacts 580 and 582 are connected by a suitable conductor 584. The connector 583 heretofore mentioned, is urged normally in the direction of the contacts 579 and 580 by a suitable spring 585.

The reference numeral 586 designates an arm pivotally mounted at 587 in a suitable switch enclosing box or housing designated 588 in Figure 1, and this lever is adapted to engage either of the two contacts 589 or 590. The lever 586 is rocked about its pivotal point by means of a link 591 connected as at 592 to a lever 593 fixed to a shaft 594 which is suitably pivoted in the housing 588. The shaft 594 is rotated by a lever 595 connected to a vertically movable rod 596 which carries adjustable operating blocks 597 and 598. This rod 596 is illustrated in Figures 10 and 31 of the drawings, and as best illustrated in these figures, it passes through a bracket 599 which is secured to the lift plate 56 as at 600. Thus, as the lift plate raises and lowers, it will engage either of two collars 601 or 602 which are adjustably secured to the rod 596 and will operate the same to reciprocate said rod for a purpose to be hereinafter described. Rigidly carried by the shaft 594 there is an arm 603 and the end 604 of this arm is adapted to operate the connector 583 of the switch 578 in order to move the same to the position in which it is shown in Figure 32 when the rod 596 is moved downwardly by the downward movement of the lift plate 56, it being understood that the connector returns to position in engagement with the contacts 579 and 580 as the rod 596 is moved upwardly by a spring 596' to rock the shaft 594 in a clockwise direction and elevate the arm 603 when the lift plate moves upwardly. The reference character 605 designates a switch arm pivotally mounted in the switch box or housing as at 606. One end of this arm 605 carries a roller 607, the other end of the arm carrying a contact 608 adapted for engagement with a contact 609. The roller 607 is adapted for engagement by either the block 597 or the block 598. When either of the blocks 597 and 598 engages the roller 607, the switch arm 605 will be moved to disengage the contact 608 with the contact 609. This is accomplished by reason of the fact that each of the blocks 597 and 598 has a cam face 610 with which the roller engages. Leading from the contact 609 there is a conductor 609' which also is connected to contact 574 of switch 570.

The leg 500 of the power line is connected to the contact 533 of the switch 525, the leg 501 of the power line being connected to the contact 535 of the switch 525. Connected as at 502' to the leg 501 of the power line, and extending to the contact 547 of the switch 537, there is a conductor 503'. Connected as at 615 to the leg 500 of the power line there is a conductor 616. This conductor 616 is connected to the contact point 511 of the switch 502, and this conductor includes the winding of the electro-magnet 514. Leading from the contact point 507 of the switch 502 there is a conductor 617 and this conductor is connected to the contact point 510 of the switch 502. Leading from the contact 509 of the switch 502 there is a conductor 618, and this conductor is connected to the contact 521 of the switch 513. The contact 521 of the switch 513 is connected with the contact 523 and said switch by a conductor 619 and leading from the contact 523 of said switch 513 there is a conductor 620 which is connected as at 621 to the leg 501 of the power line. Connected as at 622 to the leg 500 of the power line there is a conductor 623. Connected to the conductor 623 as at 624 there is a conductor 625, and this conductor 625 is connected to the contact point 571 of the switch 570 and includes the winding of the electro-magnet 526 of the switch 525. Connected to the conductor 625 as at 626 there is a conductor 627 which is connected to the contact point 506 of the switch 502. Leading from the contact 508 of the switch 502 there is a conductor 628, the other end of which is connected to the contact 563 of the switch 560. Leading from the contact 572 of the switch 570, there is a conductor 629 and this conductor is connected to the contact 581 of the switch 578. Connected to the contact 573 of the switch 570 there is a conductor 630 and this conductor is connected to the contact 579 of the switch 578.

The conductor 623 heretofore mentioned is connected to the terminal 163' of the motor 163. Connected as at 650 to this conductor 623, there is a conductor 651 which is connected to the terminal 261' of the motor 261. Connecting the terminal 163'' of the motor 163 with the terminal 261'' of the motor 261 there is a conductor 652. Electrically connected as at 653 to this conductor 652 there is a conductor 654 which is also connected to the terminal 524 of the switch 513.

Leading from the terminal 582 of the switch 578 there is a conductor 655 and this conductor 655 is connected to the contact 566 of the switch 561, and leading from the contact 567 of this switch there is a conductor 656 which is electrically connected as at 657 to the conductor 630. Electrically connected to the pivoted arm 586 there is a conductor 658, and this conductor is also connected to the switch arm 605 as at 659. Leading from the contact 589 of the switch arm 586 there is a conductor 660, and this conductor includes the winding of the electro-magnet 550 from which latter it extends to the contact 558 of the switch 549. Electrically connected to this conductor 660 as at 661 there is a conductor 662 which extends to the contact 590 of the switch arm 586 and which includes the winding of the electro-magnet 569. This conductor 660 is also electrically connected as at 664 to the conductor 544 as at 665 and to the conductor 555 as at 666, the conductor 544 being the electrical connection between the switch arms 541 and 542 of the switch 537, the conductor 555 being the electrical connection between the switch arms 551 and 552 of the switch 549. As will be hereinafter described, the motor 68 which is the elevating motor, is of the reversible type and the conductor 660 just mentioned, includes one winding 667 of the motor 68 which winding serves to drive the motor in one direction. This conductor 660 also includes an overload cut out 668 which may be of any desired form. Electrically connected as at 671 to the conductor 617 there is a conductor 672, which is also electrically connected to the contact 522 of the switch 513. Extending from the contact 534 of the switch 525 there is a conductor 674, and this conductor includes the winding of the electro-magnet 565, and extends to the contact 536 of the switch 525. Connected as at 680 to the conductor 674 there is a conductor 681 and this conductor is electrically connected to the terminal 86″ of the motor 86, and leading from the terminal 86′ of the motor 86 there is a conductor 682 which is electrically connected to the contact 536 of the switch 525. Connected as at 683 to the conductor 623, there is a conductor 684, the other end of which is connected as at 685 to the conductor 662. This conductor 684 includes the winding 686 of the motor 68 which is adapted to drive said motor in the direction opposite to that in which it is driven when the current is passed through the winding 667, heretofore mentioned. This conductor 684 also includes the winding of the electro-magnet 538 of the switch 537. Connected to the conductor 684 as at 687, there is a conductor 688, which is also connected to the contact 545 of the switch 537. Electrically connecting the contact 548 of the switch 537 with the contact 559 of the switch 549, there is a conductor 690. Electrically connected to this conductor 690 at 691 there is a conductor 692 which is connected to the terminal 68′ of the motor 68, and leading from the terminal 68″ of the motor 68 there is a conductor 693 which is connected to the terminal 546 of the switch 537. Leading from the contact 545 of the switch 537 to the contact 558 of the switch 549, there is a conductor 695. Leading from the contact 547 of the switch 537 to the contact 556 of the switch 549 there is a conductor 696. Leading from the contact 546 of the switch 537 and connected to the contact 557 of the switch 549, there is a conductor 697. Leading from the contact 557 of the switch 549 there is a conductor 698, and this conductor 698 is connected to the terminals 366′ of the motors 366.

Leading from the terminals 366″ of the motors 366 there is a conductor 699 which is also connected to the contact 559 of the switch 549. When more than one motor 366 is employed, their terminals 366′ and 366″ are connected to the conductor 699 by conductors 701 and 702, respectively. The contact 562 of the switch 560 is connected to the conductor 629 by a conductor 562′, which is electrically connected to the conductor 629 as at 629′. An electric brake such as designated 401′ may be employed to insure proper stopping of the table 76, this brake being connected in the circuit of the conductors 681 and 682 in such a manner that energizing of the brake causes release thereof.

I will now describe the manner in which the various circuits are operated and energized during the automatic operation of the machine.

In Figure 32, the several switches are shown in the various positions which they occupy when the machine is at rest.

In the starting of the machine the various hat crown supporting spindles will be driven, as will also the various tools which have moving parts to perform operations upon the brim and the crown of the hat form. In order to set these parts in operation, the switch 502 is operated to cause the bridging member 510 to engage the contacts 507 and 509. With the bridging member 510 in this position, the current will flow from the leg 500 of the power line through conductor 616, contact 511, bridging connector 512, contact 510′, conductor 617, contact 507, bridging connector 510, contact 509, conductor 618 to contact 521 of switch 513, conductor 619, conductor 620 to the point 621 on the leg 501 of the power line. The flow of current through the circuit just described energizes the electro-magnet 514, moving the various switch arms 515, 516, 517, and 518 of the switch 513 into electrical engagement respectively with the contacts 521, 522, 523, and 524. This position of the switch arms of the switch 513 will establish a circuit from the leg 500 of the power line through the conductor 616, bridging connector 512 of switch 504, conductor 617, conductor 672, switch arm 516 of switch 513, conductor 519, switch arm 515, conductor 619, and conductor 620 to the point 621 on the leg 501 of the power line. This circuit will maintain the electro-magnet 514 energized to hold the switch arms of the switch 513 in electrical contact with their respective contact points. This is necessary for the reason that release of the button of the switch 502 will break the circuit first described and render the several circuits inoperative unless a holding circuit is established for the switch arms of the switch 513.

In addition to the holding circuit described, movement of the switch arms 515, 516, 517, and 518 establish certain other circuits.

With the switch arms 515—518 in engagement with their respective contacts, a circuit will be established as follows: Through the conductor 625, conductor 627, bridging connector 510 of switch 502, conductor 628, bridging connector 564 of the switch 560, conductor 562′, conductor 629, bridging connector 583 of the switch 578, conductor 655, conductor 654, switch arm 518 of switch 513, conductor 520, switch arm 517, and conductor 620 to the point 621 on the leg 501 of the power line. The establishment of this circuit will energize the electro-magnet 526 and move the switch arms 527, 528, 529, and 530 of the switch 525 into engagement respectively with the contact points 533, 534, 535, and 536.

With the switch arms 527—530 of the switch 525 in electrical connection with their respective contacts 533—536, a circuit will be established to set in operation the table turning motor 86, and this circuit is as follows: Leg 500 of the power line, switch arm 527, conductor 531, switch arm 528, conductor 674, conductor 681, table turning motor 86, conductor 682, switch arm 530, conductor 532, switch arm 529 to the leg 501 of the power line. With the parts in this position a circuit is established as follows: From the leg 500 of the power line through the arm 527 of the switch 525, conductor 531, switch arm 528 of the switch 525, conductor 674, switch arm 530 of the switch 525, conductor 532, switch arm 529 of the switch 525, to the leg 501 of the power line. This circuit will energize the coil 565 of the switch 560 which will begin to slowly operate to move the bridging connector 564 out of engagement with the contacts 562 and 563. When this circuit is broken at the contacts 562 and 563, the electromagnet 526 would become de-energized and the several switch arms 527-530 moved out of engagement with their respective contacts if it were not for their holding circuit, which, when the switch arms engage their respective contacts is established as follows: Leg 500 of the power line, conductor 623, conductor 625, to contact 571 of the switch 570, bridging connector 575, conductor 629, bridging connector 583 of the switch 578, conductor 655, conductor 654, switch arm 518 of the switch 513, conductor 520, switch arm 517 of the switch 513 and conductor 620 to the leg 501 of the power line. It will thus be seen that the circuit just described will hold the switch arms 527—530 of the switch 525 in engagement with their respective contact points after the circuit which moves them into engagement therewith has been opened by the operation of the switch 560.

The table is now turning, being driven by the motor 86 to move the several hat form supporting spindles to a succeeding station of operation. When the hat form spindles reach position at the succeeding station, the table turning motor 86 is automatically stopped and this is accomplished in the following manner. As best illustrated in Figure 8 of the drawings, the table 76 carries a projecting arm 700, there being one of these arms properly positioned with respect to each hat supporting spindle so that as the hat supporting spindle reaches the station at which an operation is to be performed, one of the arms 700 will engage the extension 577 of the switch 570 to cause the bridging connector 575 to disengage the contact points 571 and 572 to open the holding circuit of the electro-magnet 526, thus permitting the arms 527—530 of the switch 525 to move out of engagement with their respective contact points thereby to open the circuit to the table turning motor and stop the table.

Simultaneously with the starting of the table turning motor 86, the motor 163 is started into operation in order that the sprocket 161 may be driven by the chain 160 and the sprocket 162. The circuit to this motor 163 is established in the following manner. Leg 500 of the power line, conductor 623, terminal 163' of the motor 163, terminal 163", conductor 652, conductor 654, switch arm 518, conductor 520, switch arm 517, conductor 620 to point 621 on the leg 501 of the power line. The tool motor 261 is arranged in the same circuit, in series therewith being connected with the conductor 623 by a conductor 651, the conductor 652 being connected with the terminal 261" of said motor 261.

As the table is stopped and the tool motor started, the mechanism which causes the hat crown tools to travel the contour of the hat crowns is next brought into operation. This is effected by the raising and lowering of the lift plate 56, the shaft 60 being rotated by the motor 68 to drive the shaft 60 and the screw 61. As the lift plate is elevated or lowered, through movement of the levers 180 and 181 about their several pivotal points, the point 182 is caused to follow the curved slots 189 of the members 188 to carry the crown finishing tools over the surface of the crown of the hat form. In Figure 5 the lift plate 56 is shown at substantially its lowest point and as the motor 68 starts, it is elevated until the hat crown tools reach substantially the position in which they are shown in Figure 6, whereupon the motor 68, being of the reversible type, is reversed to lower the lift plate 56 and return the hat crown tools to the position in which the tool is shown in Figure 5. With the parts in the position in which they are shown in Figure 5, the circuit to start the motor 68 in the proper direction to elevate the lift plate 56 is as follows: From the point 622 on the leg 500 of the power line through conductor 623, to the point 683 on the conductor 623, winding 686 of the motor 68, conductor 684 to the point 687, conductor 688, contact point 545 of switch 537, conductor 695 to contact 558 of switch 549, conductor 660, to the point 663, conductor 662 to point 661 on conductor 660, winding of the magnet 550 to the point 670 on the conductor 660 through the conductor 660 to the contact 589 through the pivoted arm 586, conductor 658, switch arm 605, contact 609, conductor 609' to the contact 574 of the switch 570 through the bridging connector 575, contact 573, conductor 630 to the point 657, conductor 656, bridging contact 568 of the switch 561, conductor 655, conductor 654, switch arm 518, conductor 520, switch arm 517 and conductor 620 to the point 621 on the leg 501 of the power line. This circuit will energize the winding 550 of the electro-magnet of the switch 549 and move the several switch arms of the switch 549 into engagement with their respective contact points 556—559. With the switch arms in engagement with their respective contact points, the circuit, through the winding 667 of the elevating motor 68, which circuit will cause the elevating motor to rotate in the proper direction to drive the shaft 60 in the proper direction to elevate the lift plate 56, is as follows: From the point 622 on the leg 500 of the power line through a conductor 623 to the point 683, through conductor 684 to the point 687, through conductor 688 to the contact 545 of the switch 537 through the conductor 695 to the contact 558 of the switch 549, arm 553 of the switch 549, conductor 556, arm 554 of switch 549, contact 559, conductor 699, conductor 692, elevating motor 68, conductor 693 to the contact 546 of the switch 537, conductor 697 to the contact point 557 of the switch 549, switch arm 552, conductor 555, switch arm 551 to the contact 556 of the switch 549, conductor 696 to the contact 547 of the switch 537 and conductor 503' to the point 502' on the leg 501 of the power circuit. As the motor 86 drives the lift plate upwardly, said lift plate moves away from the collar 601 and the spring 596' elevates the rod 596. This elevation of the rod 596 rocks the shaft 594 through the medium of the lever 595. Rocking the shaft 594 elevates the arm 603 and its end 604 passes out of engagement with the bridging connector 583 and allows the spring 585 to move the bridging connector into engagement with the contacts 579 and 580. Engagement of the bridging connector 583 with the contacts 579 and 580 establishes a holding circuit for the electro-magnet 550 as follows: From the point 622 on the leg 500, of the power line, through the conductor 623 to the point 683, winding 686, conductor 684 to the point 687, conductor 688 to contact 545 of switch 537, conductor 695 to contact 558 of switch 549, conductor 660 to the point 663, conductor 662 to the point 661, winding of the magnet 550 to the point 670, conductor 660 to the contact 589 of the pivoted arm 586, through the pivoted arm 586 to the conductor 658, to the switch arm 605, contact 609, conductor 609' to the contact 574 of the switch 570, bridging connector 575 to contact 573 of the switch 570, conductor 630 to the contact 579, through the bridging connector 583 to the contact 580, it being remembered that the bridging connector 583 has been moved by the spring 585 into engagement with the contacts 579 and 580, through conductor 584 to conductor 655 to conductor 654 to the contact 524 of the switch 513, arm 518, conductor 520, arm 517, and contact 523 of the switch 513, and conductor 620 to the point 621 on the leg 501 of the power line. This holding circuit for the electro-magnet 550, maintains the several arms of the switch 549 in engagement with their respective contacts to maintain the elevating motor in operation in the proper direction to elevate the lift plate. As the lift plate reaches the limit of its upward movement, the pivoted arm 586 will be moved out of engagement with the contact 589 and into engagement with the contact 590. This is done in order that the magnet 538 of the switch 537 may be operated to establish a circuit through the motor 68 to reverse its movement and drive the shaft 60 and its screw 61 in the proper direction to move the lift plate downwardly. These two circuits will now be described.

The circuit to energize the winding of the magnet 538 is as follows: From the point 622 on the leg 500 of the power line through the conductor 623 to the point 683, conductor 684, winding of the magnet 538 to the point 685 on the conductor 662, through the conductor 662 to the contact 590, through the pivoted arm 586, it being remembered that this arm has been moved into engagement with the contact 590 by the spring 596', conductor 658 to the switch arm 605, conductor 609' to the contact 574 of the switch 570, bridging connector 575, and contact 573 of the switch 570, conductor 630 to the point 657, conductor 656, contact 567, bridging connector 568 and contact 566 of the switch 561, conductor 655 to the conductor 654, contact 524, switch arm 518, conductor 520, switch arm 517 and contact 523 of the switch 513, conductor 620 to the point 621 on the leg 501 of the power line. This circuit, as before stated, will energize the winding of the electro-magnet 538 and move the switch arms of the switch 537 into engagement with their respective contact points to establish the reverse circuit to the elevating motor 68.

The reverse circuit of the elevating motor 68 is as follows: From the point 622 on the leg 500 of the power line through the conductor 623 to the point 683, conductor 684 to the point 687, conductor 688 to the contact 545, arm 539, conductor 543 and arm 540 of the switch 537, conductor 693, elevating motor 68, conductor 692, conductor 690 to the contact 548, arm 542, conductor 544, arm 541 and contact 547 of the switch 537 and conductor 503' to the point 502' on the leg 501 of the power line.

During the operation of the machine, as the lift plate reaches the lower limit of its movement, the end 604 of the arm 603 will engage the bridge connector 583 of the switch 578 and move it out of engagement with the contacts 579 and 583, thus breaking the circuit of the elevating motor 68. The movement of the arm 603 is caused by engagement of the projection 599 of the lift plate 56 with the collar 601 on the rod 596, which moves the rod downwardly and rocks the shaft 594 through the medium of the arm 595.

To insure that this circuit will be broken, the block 597 will rock the switch arm 605 about its pivotal point to also break this circuit between the contacts 608 and 609. This happens each time the elevating table descends, and to insure breaking of the circuit driving the elevating motor to raise the lift plate, the block 598 will move the switch arm 605 to break the circuit, at that time energizing the elevating motor 68 when the lift plate has reached the limit of its upward movement.

When the circuit above described to the elevating motor is broken, as the lift plate reaches its lower limit of movement, the coil 569 of the switch 561 is de-energized, thus preventing the motor reversing to immediately drive the lift plate again upwardly.

As the bridging connector 583 moves into engagement with the contacts 581 and 582, the circuit heretofore described for starting the table in operation is completed and the table will be rotated to advance the several hat forms being operated upon to the proper tools to perform the successive operations.

The two motors 366 are in a circuit which is energized only as the lift plate is elevated. During the downward movement of the lift plate, these motors are not operating and the circuits therefor are therefore de-energized. The tools operated by these motors on the down movement of the lift plate do not vibrate but remain at rest, the hat form spindles being rotated so that the hat forms move in engagement with the tools without movement of the tools. However, on the upward movement of the lift plate, these tools are vibrated and the circuit for driving their motors is as follows: Point 622 on the leg 500 of the power line, conductor 623 to the point 683, conductor 684 to the point 687, conductor 688 to the contact 545 of the switch 537, conductor 695 to the contact 558 of the switch 549, switch arm 533, conductor 556, switch arm 554 and contact 559 of the switch 549, conductor 699, through the motors, conductor 698 to the contact 559, switch arm 552, conductor 555, switch arm 551 and contact 556 of the switch 549, conductor 696 to the contact 547 of the switch 537, and conductor 503' to the point 502' on the leg 501 of the power line. Thus upon the upward movement of the lift plate, this circuit will be energized but it will be broken at the switch 549 when the electro-magnet 550 is de-energized, as heretofore described upon beginning of the downward movement of the lift plate.

While the machine is automatic in its operation, the same may be manually stopped at any time by operation of the stop button of the switch 504. Manual operation of this stop button will disengage the bridging conductor 512 with the contacts 510' and 511, breaking the circuit which energizes the electro-magnet 514 and permitting the switch arms of the switch 513 to move out of engagement with their respective contacts, thus opening all of the circuits which cannot again be established without manual operation of the starting button of the switch 504.

In Figure 33, there is illustrated a power line comprising the two legs 700' and 701. This power line is provided with a suitable switch 702 and in this line the heating elements 171 of the two crown irons, the heating elements 225 of the brim iron, the two heating elements 331 and the two heating elements 341 of the two brim luring tools and the heating elements 382 of the two crown luring tools are connected in parallel.

From the foregoing it will be apparent that the present invention provides a new and improved hat finishing machine in which, after the machine has been manually set into operation, is wholly automatic in its several operations, except that the hat forms to be finished are placed in position upon the machine in their unfinished state and removed therefrom in their finished state, manually.

While the invention has been herein illustrated in its preferred form, it is to be understood that it is not to be limited to the specific details herein shown and that it may be carried out in other forms without departing from the spirit thereof.

Having thus described the invention, what is claimed as new, is:

1. A hat finishing machine comprising a plurality of hat finishing tools arranged in a circular series, a circular table surrounding said circular series of hat finishing tools, a plurality of hat form supporting members carried by said circular table, and means for intermittently moving said circular table to singly and successively present said hat form supporting members to the hat finishing tools.

2. A hat finishing machine comprising a plurality of hat finishing tools arranged in a circular series at spaced fixed intervals, a circular table surrounding said circular series of hat finishing tools, hat form supporting members carried by said circular table, means for rotating said circular table to successively position said hat form carrying members in operative relation to said hat finishing tools, and means for rotating said hat supporting members while in the presence of the hat finishing tools.

3. A hat finishing machine comprising a plurality of hat finishing tools arranged in a circular series, a circular table surrounding said circular series of hat finishing tools, a plurality of hat form supporting members carried by said circular table, means for moving said circular table to singly and successively present said hat form supporting members to the hat finishing tools, and means for rotating said hat form supporting members while at the positions of the hat finishing tools.

4. A hat finishing machine comprising a suitable supporting frame of substantially circular form, a plurality of hat finishing tools arranged in circular form about said frame, an intermittently rotated table surrounding said frame, a plurality of hat form supporting members carried by said table, means for rotating said table intermittently to successively position said hat supporting members at the hat finishing tools, and means for rotating said hat supporting members when they are positioned at the hat finishing tools.

5. A hat finishing machine comprising a suitable supporting frame of substantially circular form, a plurality of hat finishing tools arranged in circular form about said circular frame, a power transmitting train at each of said hat finishing tools, a table surrounding said frame, a plurality of hat form supporting spindles carried by said table, means for intermittently rotating said table to successively position said hat form supporting spindles in operative relation to said hat finishing tools, and means for operatively connecting said hat form supporting spindles with said power transmitting trains whereby to rotate said hat form supporting spindles while in the presence of the hat finishing tools.

6. In a hat finishing machine, a substantially circular frame, a substantially circular table surrounding said frame and movable with a step-by-step motion therearound, a plurality of hat finishing tools carried by said frame and arranged in circular spaced relation thereon, a plurality of hat form supporting spindles carried by said table and successively operatively positioned relative to the hat finishing tools by rotation of the table, and means for individually driving said hat form supporting spindles when they are in the presence of the hat finishing tools.

7. An automatic hat finishing machine comprising in combination, a plurality of hat finishing tools arranged in a circular series for performing successively, finishing operations upon hat forms, a substantially circular frame for supporting said hat finishing tools at fixed points in said circular series, a circular table supported by said frame, said table surrounding said hat finishing tools, a plurality of hat form supporting spindles carried by said table at fixed points thereon and so arranged that each may be operatively positioned with relation to each of said hat finishing tools, and means for automatically rotating said table intermittently to successively position each of said hat form supporting spindles in operative relation with each of said hat finishing tools.

8. An automatic hat finishing machine comprising in combination, a plurality of hat finishing tools arranged in a circular series for performing successively, finishing operations upon hat forms, a substantially circular frame for supporting said hat finishing tools at fixed points in said circular series, a circular table supported by said frame, said table surrounding said hat finishing tools, a plurality of hat form supporting spindles carried by said table at fixed points thereon and so arranged that each may be operatively positioned with relation to each of said hat finishing tools, means for automatically rotating said table intermittently to successively position each of said hat form supporting spindles in operative relation with each of said hat finishing tools, and means for yieldingly holding a hat form carried by said hat form supporting spindles in engagement with the hat finishing tools while the hat forms are being operated upon by the tools.

9. An automatic hat finishing machine comprising in combination, a plurality of hat finishing tools arranged in a circular series for performing successively finishing operations upon hat forms, a substantially circular frame for supporting said hat finishing tools at fixed points in said circular series, a circular table supported by said frame, said table surrounding said hat finishing tools, a plurality of hat form supporting spindles carried by said table at fixed points thereon and so arranged that each may be operatively positioned with relation to each of said hat finishing tools, means for automatically rotating said table intermittently to successively position each of said hat form supporting spindles in operative relation with each of said hat finishing tools, and means for moving the hat form supporting spindles radially of said circular series, while the hat forms are being moved from operative relation with one of the hat finishing tools to another.

10. An automatic hat finishing machine comprising in combination, a plurality of hat finishing tools arranged in a circular series for performing successively finishing operations upon hat forms, a substantially circular frame for supporting said hat finishing tools at fixed points in said circular series, a circular table supported by said frame, said table surrounding said hat finishing tools, a plurality of hat form supporting spindles carried by said table at fixed points thereon and so arranged that each may be operatively positioned with relation to each of said hat finishing tools, means for automatically rotating said table intermittently to successively position each of said hat form supporting spindles in operative relation with each of said hat finishing tools, and means for rotating said hat form supporting spindles while they are operatively associated with the hat finishing tools.

11. An automatic hat finishing machine comprising in combination, a plurality of hat finishing tools arranged in a circular series for performing successively finishing operations upon hat forms, a substantially circular frame for supporting said hat finishing tools at fixed points in said circular series, a circular table supported by said frame, said table surrounding said hat finishing tools, a plurality of hat form supporting spindles carried by said table at fixed points thereon and so arranged that each may be operatively positioned with relation to each of said hat finishing tools, means for automatically rotating said table intermittently to successively position each of said hat form supporting spindles in operative relation with each of said hat finishing tools, means for rotating said hat form supporting spindles while they are operatively associated with the hat finishing tools, and means for maintaining the hat forms carried by the hat form supporting spindles, in yielding engagement with the hat finishing tools while being operated upon by said tools.

12. A hat finishing machine comprising in combination, a plurality of hat form finishing tools, means for causing said form finishing tools to follow the contour of a hat crown, said means comprising a suitable stationary support for each of said tools, stationary brackets having curved slots through which the tool supports travel, and a single means for elevating said tool supports.

13. A hat finishing machine comprising in combination, a plurality of hat form finishing tools, means for causing said form finishing tools to follow the contour of a hat form crown, said means comprising a suitable support for each of said tools, stationary brackets having curved slots through which the tool supports travel, hat form carrying means for successively presenting a plurality of hat forms to said tools, automatic means for intermittently operating said hat form carrying means, means for moving said tool supports through the slots of said brackets and means controlled by the movement of the hat form carrying means for controlling the operation of the means for moving the tool supports through the slots of said brackets.

14. A hat finishing machine comprising in combination, a plurality of hat form finishing tools, means for causing said finishing tools to follow the contour of a hat form crown, said means comprising a suitable support for each of the forms being operated upon, means for rotating said support and the hat form carried thereby, means for pivotally mounting said hat form supports, a cam carried by each hat form support, means for engagement with said cam for moving the hat form supports about their pivotal points relatively to the finishing tools, means for holding said cams in engagement with said last mentioned means, and brackets having curved slots for moving the tools to the center of the crown of the hat forms carried by the hat form supports.

15. In a hat finishing machine, a plurality of tools for finishing a hat form brim, each of said tools comprising two members adapted to operatively hold a hat brim therebetween, means for moving the hat forms being operated upon successively to the finishing tools, and means for automatically opening the members of the tools during movement of the hat form brims from one tool to another.

16. In a hat form finishing machine, a frame, a plurality of driven shafts mounted in said frame in spaced relation to one another, means for driving said shafts, a driving gear carried by each of said driven shafts, a table rotatably mounted in said frame, a plurality of hat form supporting spindles rotatably mounted in said table, and movable therewith into operative driving relation with the afore-mentioned driven shafts, a plurality of gears of different sizes carried by each of said hat form supporting spindles, means for selectively connecting the driving gears carried by the several driven shafts selectively with the gears of the hat form supporting spindles, and means for rotating said rotatably mounted table.

17. In a hat form finishing machine, a frame, a ring gear, means for rotatably mounting said ring gear in said frame, means for rotating said ring gear in said frame, a circular table, means for rigidly mounting said table on said ring gear in such manner that the ring gear and table will rotate together, a plurality of driven shafts rotatably mounted in said frame, means for individually driving said driven shafts, a plurality of frame-like members, means for pivotally mounting said frame-like members between the ring gear and the circular table, a hat form supporting spindle rotatably mounted in each of said frame-like members, means for rotating said hat form supporting spindles from the first mentioned driven shafts, a plurality of tools for performing operations upon the hat forms carried by the hat form supporting tools, and means for rocking said pivoted frame-like members about their pivotal point to move the hat forms carried by the hat form supporting spindles relatively to the tools for performing operations thereon.

18. In a hat form finishing machine, a frame, a ring gear, means for rotatably mounting said ring gear in said frame, means for rotating said ring gear in said frame, a circular table, means for rigidly mounting said table on said ring gear in such manner that the ring gear and table will rotate together, a plurality of driven shafts rotatably mounted in said frame, means for individually driving said driven shafts, a plurality of frame-like members, means for pivotally mounting said frame-like members between the ring gear and the circular table, a hat form supporting spindle rotatably mounted in each of said frame-like members, means for rotating said hat form supporting spindles from the first mentioned driven shafts, a plurality of tools for performing operations upon the hat forms carried by the hat form supporting tools, and means for rocking said pivoted frame-like members about their pivotal point to move the hat forms carried by the hat form supporting spindles relatively to the tools for performing operations thereon, said last mentioned means including a cam carried by each of said hat form supporting spindles, and rotating therewith, and means carried by the frame for engagement with said cam.

19. In a hat form finishing machine, a frame, a ring gear, means for rotatably mounting said ring gear in said frame, means for rotating said ring gear in said frame, a circular table, means for rigidly mounting said table on said ring gear in such manner that the ring gear and table will rotate together, a plurality of driven shafts rotatably mounted in said frame, means for individually driving said driven shafts, a plurality of frame-like members, means for pivotally mounting said frame-like members between the ring gear and the circular table, a hat form supporting spindle rotatably mounted in each of said frame-like members, means for rotating said hat form supporting spindles from the first mentioned driven shafts, a plurality of tools for performing operations upon the hat forms carried by the hat form supporting tools, and means for rocking said pivoted frame-like members about their pivotal point to move the hat forms carried by the hat form supporting spindles relatively to the tools for performing operations thereon, said last mentioned means including a cam carried by each of said hat form supporting spindles and rotating therewith, means carried by the frame for engagement with said cam, and means for maintaining said cam in engagement with the last mentioned means.

20. In a hat form finishing machine, a frame, a plurality of driven shafts mounted at intervals around said frame, means for driving said shafts, a rotatable ring gear, means for rotatably mounting the ring gear on the frame, a circular table, means for rigidly mounting said circular table on said ring gear, means for rotating said ring gear and said table, a plurality of frame-like members carried by said ring gear and circular table, means for pivotally mounting said frame-like members, a hat form supporting spindle carried by each of said frame-like members, a plurality of tools for performing operations upon the hat forms carried by the hat form supporting spindles, means for maintaining a hat form carried by each hat form supporting spindle in engagement with its respective tool, and means operative in opposition to said last mentioned means for moving the hat forms out of engagement with its respective tool.

21. In a hat form finishing machine, a frame, a plurality of driven shafts mounted at intervals around said frame, means for driving said shafts, a rotatable ring gear, means for rotatably mounting the ring gear on the frame, a circular table, means for rigidly mounting said circular table on said ring gear, means for rotating said ring gear and said table, a plurality of frame-like members carried by said ring gear and circular table, means for pivotally mounting said frame-like members, a hat form supporting spindle carried by each of said frame-like members, a plurality of tools for performing operations upon the hat forms carried by the hat form supporting spindles, means for maintaining a hat form carried by each hat form supporting spindle in engagement with its respective tool, and means operative in opposition to said last mentioned means for moving the hat forms out of engagement with their respective tool, said last mentioned means being automatically operated upon rotary movement of the table.

22. In a hat form finishing machine, a frame, a plurality of driven shafts mounted at intervals around said frame, means for driving said shafts, a rotatable ring gear, means for rotatably mounting the ring gear on the frame, a circular table, means for rigidly mounting said circular table on said ring gear, means for rotating said ring gear and said table, a plurality of frame-like members carried by said ring gear and circular table, means for pivotally mounting said frame-like members, a hat form supporting spindle carried by each of said frame-like members, a plurality of tools for performing operations upon the hat forms carried by the hat form supporting spindles, means for maintaining a hat form carried by each hat form supporting spindle in engagement with its respective tool, and means operative in opposition to said last mentioned means for moving the hat forms out of engagement with their respective tool, and including a stationary cam plate, a roller carried by each of said hat form supporting spindles, and means for maintaining said rollers in engagement with the said cam plate.

23. In a hat form finishing machine, a frame, a plurality of hat form finishing tools carried by said frame and arranged thereon in fixed positions, a rotatable circular table surrounding said tools, a plurality of rotatable hat form supporting spindles carried by said table, a hat form supporting block carried by each of said hat form supporting spindles, means for intermittently rotating said table, to operatively position the hat form carrying blocks relatively to the hat form finishing tools, and means for rotating the hat form supporting spindles only while they are operatively positioned with relation to the hat form finishing tools.

24. In a hat form finishing machine, a frame, a plurality of hat form finishing tools carried by said frame and arranged thereon in fixed positions, a rotatable circular table surrounding said tools, a plurality of rotatable hat form supporting spindles carried by said table, a hat form supporting block carried by each of said hat form supporting spindles, means for intermittently rotating said table, to operatively position the hat form carrying blocks relatively to the hat form finishing tools, and means for rotating the hat form supporting spindles only while they are operatively positioned with relation to the hat form finishing tools, said last mentioned means including a plurality of driving gears carried by the frame and arranged in fixed positions thereon, and means for simultaneously driving said driving gears from a single source of power.

IRVING A. EICHENBAUM.